(12) United States Patent
Trudeau

(10) Patent No.: US 11,833,596 B2
(45) Date of Patent: Dec. 5, 2023

(54) INTERNAL PILE CUTTER

(71) Applicant: Leon Trudeau, Brossard, LA (US)

(72) Inventor: Leon Trudeau, Brossard, LA (US)

( * ) Notice: Subject to any disclaimer, the term of this patent is extended or adjusted under 35 U.S.C. 154(b) by 0 days.

(21) Appl. No.: 16/968,361

(22) PCT Filed: Feb. 27, 2019

(86) PCT No.: PCT/US2019/019841
§ 371 (c)(1),
(2) Date: Aug. 7, 2020

(87) PCT Pub. No.: WO2019/173096
PCT Pub. Date: Sep. 12, 2019

(65) Prior Publication Data
US 2021/0025123 A1    Jan. 28, 2021

Related U.S. Application Data

(60) Provisional application No. 62/639,204, filed on Mar. 6, 2018.

(51) Int. Cl.
*B23D 21/14* (2006.01)
*B26D 3/16* (2006.01)
(Continued)

(52) U.S. Cl.
CPC ............ *B23D 21/14* (2013.01); *E02D 9/005* (2013.01); *F15B 11/17* (2013.01); *F15B 15/24* (2013.01);
(Continued)

(58) Field of Classification Search
CPC ......... Y10T 83/398; E02D 9/005; E02D 9/04; B23D 21/14; B23D 21/00; B26D 3/163;
(Continued)

(56) References Cited

U.S. PATENT DOCUMENTS 2,743,781 A      5/1956  Lane
3,555,831 A *   1/1971  Pogonowski ........... E02B 17/00
                                                                 29/523

(Continued)

FOREIGN PATENT DOCUMENTS

KR        100790006 B1    1/2008

OTHER PUBLICATIONS

International Search Report for PCT/US2019/019841 dated May 8, 2019 (2 pages).
Written Opinion of the ISA for PCT/US2019/019841 dated May 8, 2019 (5 pages).

*Primary Examiner* — Phong H Nguyen
(74) *Attorney, Agent, or Firm* — Fitch, Even, Tabin & Flannery, LLP

(57) ABSTRACT

Assemblies to cut a hollow piling are provided, which may have a pressurized hydraulic fluid supply configured to supply enough force to cut through up to the circumference of a piling having a housing having a cavity to receive the hydraulic fluid, the housing having at least one cylinder wall; at least one piston assembly slidably disposed within the at least one cylinder wall configured to extend from the at least one cylinder wall in response to the introduction of pressurized hydraulic fluid into the housing cavity; and a blade attached at a radially distal end of the piston assembly, whereby as the blade extends through the cylinder wall, a cutting force is applied to an encountered piling wall.

11 Claims, 27 Drawing Sheets

(51) Int. Cl.
*E02D 9/04* (2006.01)
*E02D 9/00* (2006.01)
*F15B 11/17* (2006.01)
*F15B 15/24* (2006.01)

(52) U.S. Cl.
CPC ............... *F15B 2211/20576* (2013.01); *F15B 2211/7051* (2013.01); *F15B 2211/71* (2013.01)

(58) Field of Classification Search
CPC ......... B26D 3/164; B26D 3/165; F15B 11/17; F15B 15/24; F15B 221/20576; F15B 221/7051; F15B 221/71
See application file for complete search history.

(56) References Cited

U.S. PATENT DOCUMENTS

| | | | |
|---|---|---|---|
| 3,992,777 A * | 11/1976 | Perkins | B23D 29/007 |
| | | | 30/180 |
| 4,768,899 A | 9/1988 | Dysarz | |
| 5,139,006 A | 8/1992 | Trudeau | |
| 5,245,982 A | 9/1993 | Trudeau | |
| 5,413,086 A | 5/1995 | Trudeau | |
| 9,038,723 B2 | 5/2015 | Trudeau et al. | |
| 2011/0290091 A1 | 12/2011 | Clark, II et al. | |
| 2014/0112722 A1* | 4/2014 | Chin | E02D 5/54 |
| | | | 405/244 |
| 2017/0328159 A1 | 11/2017 | Haugland et al. | |

* cited by examiner

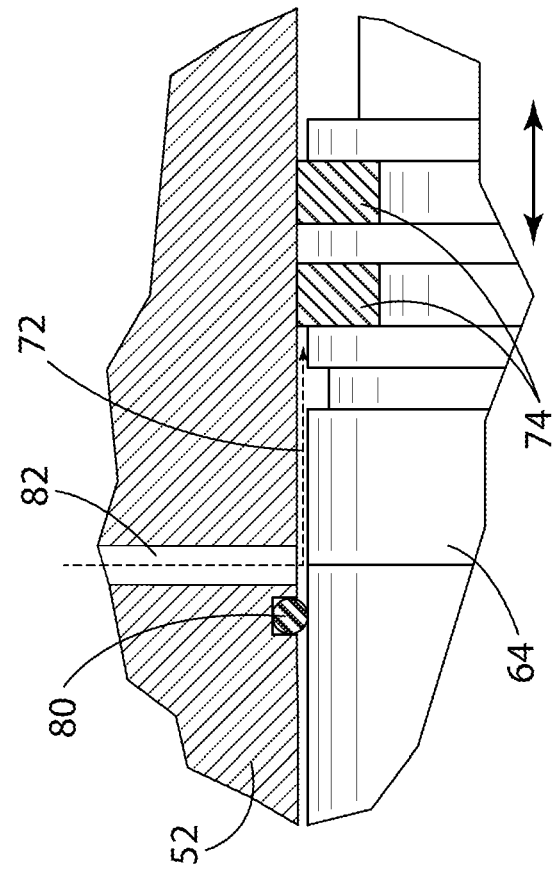
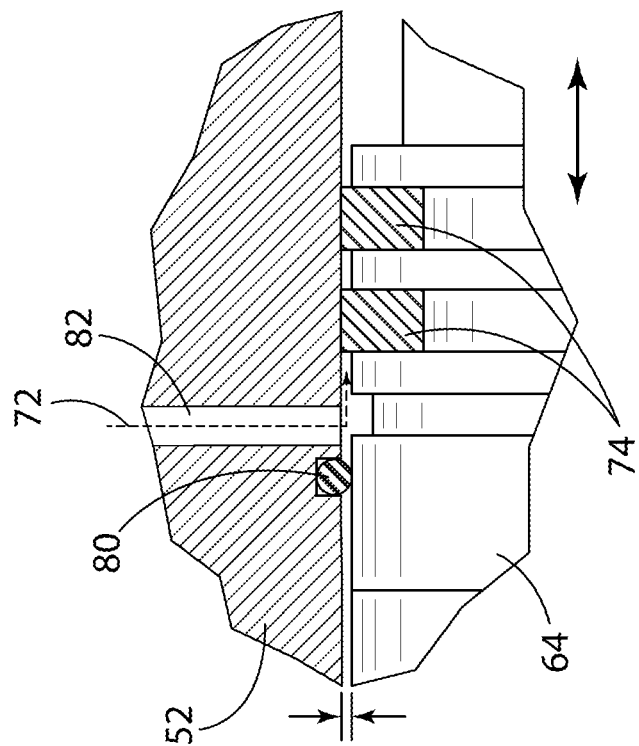

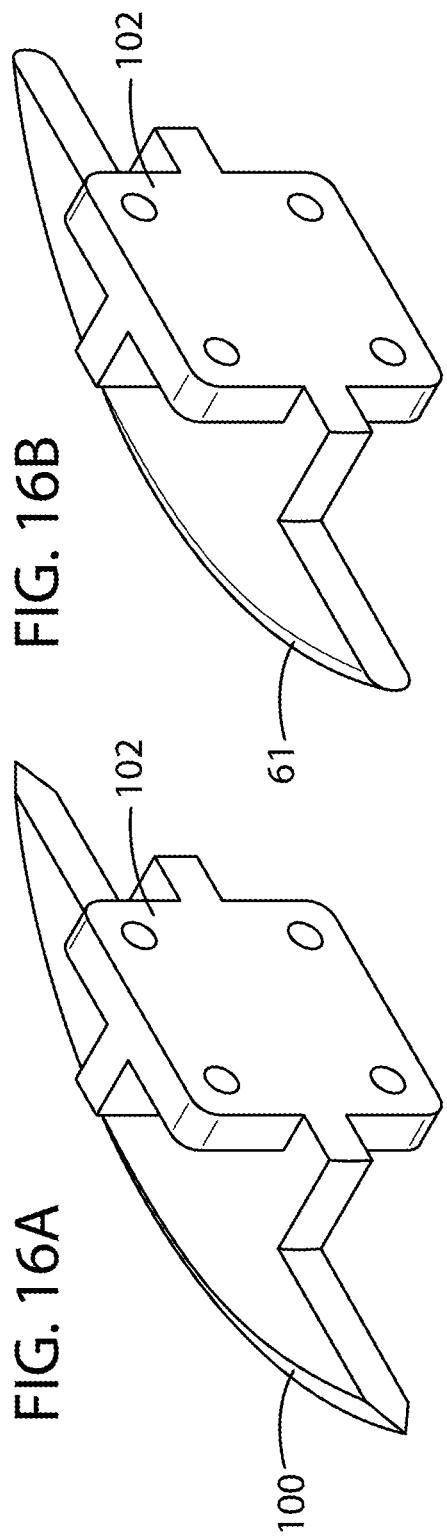

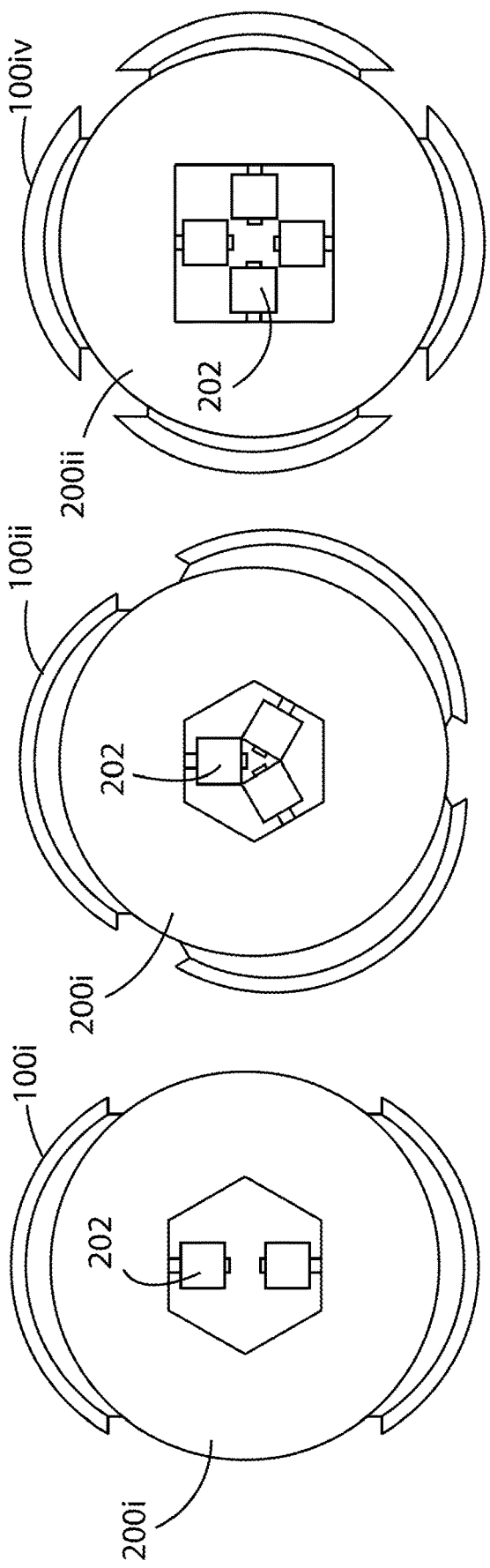
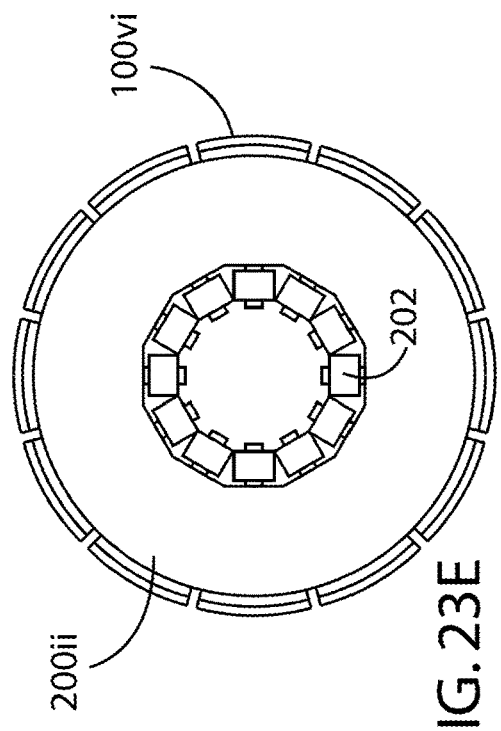
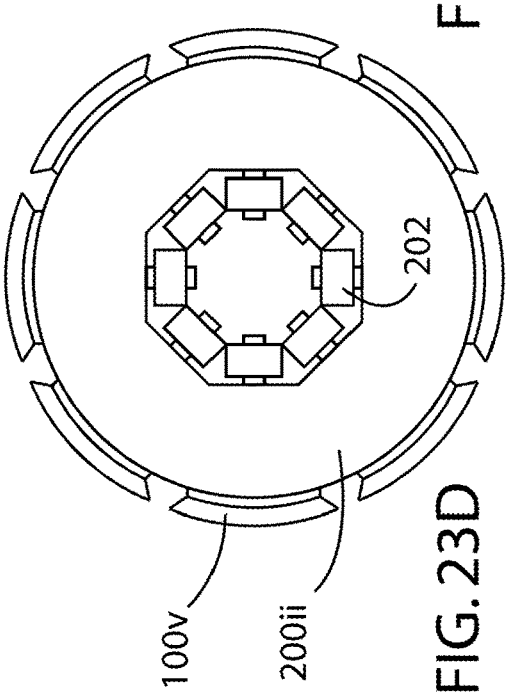

INTERNAL PILE CUTTER

CROSS-REFERENCE TO RELATED APPLICATIONS

This application is a U.S. national phase application filed under 35 U.S.C. § 371 of International Application No. PCT/US2019/019841, filed Feb. 27, 2019, designating the United States, which claims priority from U.S. Provisional Patent Application No. 62/639,204, filed Mar. 6, 2018, which are hereby incorporated herein by reference in their entirety for all purposes.

FIELD

Presented herein are assemblies and methods to internally cut tubes, and the like, such as large scale hollow metal pilings, and in particular internal tube cutters and methods utilizing multiple cutters and methods driven by a common hydraulic source having a separate hydraulic assemblies and methods to retrieve the cutters from an extended position.

BACKGROUND

Various means of cutting tubes and pilings are known, cutting from the outside of the piling, or cutting from the inside of a hollow piling (see generally, U.S. Pat. Nos. 9,038,723; 5,413,086; 5,245,982; and 5,139,006, which are incorporated herein in their entirety). Despite advances in the art there remains a desire and a need in the art to provide economical and effective tools to provide internal cutting capabilities.

SUMMARY

Accordingly, to advance at least the aforementioned deficiencies in the art, described herein are assemblies to internally cut tubes, pilins and the like.

An assembly to cut a hollow piling may have a pressurized hydraulic fluid supply configured to supply enough force to cut through up to the circumference of a piling having a housing having a cavity to receive the hydraulic fluid, the housing having at least one cylinder wall; at least one piston assembly slidably disposed within the at least one cylinder wall configured to extend from the at least one cylinder wall in response to the introduction of pressurized hydraulic fluid into the housing cavity; and a blade attached at a radially distal end of the piston assembly, whereby as the blade extends through the cylinder wall, a cutting force is applied to an encountered piling wall.

According to one approach, the pressurized hydraulic fluid supply may be in a range up to 20,000 PSI (pounds per square inch), preferably in the range of about 8,000 to 12,000 PSI, and most preferably about 10,000 PSI.

According to one approach, the assembly may further comprise at least one sealing ring on the piston; a fixed piston sealing ring on the cylinder wall radially distal from the at least one piston sealing ring; and a second hydraulic supply between the cylinder wall sealing ring and the at least one piston sealing ring, whereby the hydraulic supply supplies enough force to retract a cutter/piston assembly from an extended position to a retracted position into an unpressurized housing cavity. The pressurized second hydraulic fluid supply can be in a range up to 5,000 PSI (or approximately 750 pounds of force).

In one approach, the housing can be 32 inches, whereby it is sized to cut a 36 inch diameter pipe with a 1 inch thickness (OD 36", ID 34").

In one approach, the piston can have a stroke of up to 4.5 inches (i.e., the full travel of the piston along the cylinder, in either direction). The piston/blade assembly may have a stop to limit extending beyond a predetermined stroke.

In one approach the blade may have a rounded edge to crimp rather than cutting through a pipe surface.

In one approach, the blade edges may be stepped on the upper and lower surface to allow overlapping of the blades when the blades are retracted.

Other features will become more apparent to persons having ordinary skill in the art to which the assemblies pertain and from the following description and claims.

BRIEF DESCRIPTION OF THE DRAWINGS

FIG. 7A illustrates a close-up side view of area VII-A in FIG. 5 of a hydraulic configuration to push the extended piston to a retracted position.

FIG. 7B illustrates a close-up side view of area VII-B in FIG. 6 of a hydraulic configuration to push an extended piston in a retracted position.

FIG. 16A illustrates a perspective view of an exemplary cutter edge of the present embodiments according to another approach with an arched blade.

FIG. 16B illustrates a perspective view of an exemplary cutter edge of the present embodiments according to another approach with a rounded edge to allow crimping.

FIG. 23A illustrates a top view of the present embodiments according to another approach with two blades the hydraulic pistons in an extended position.

FIG. 23B illustrates a top view of the present embodiments according to another approach with three blades the hydraulic pistons in an extended position.

FIG. 23C illustrates a top view of the present embodiments according to another approach with four blades the hydraulic pistons in an extended position.

FIG. 23D illustrates a top view of the present embodiments according to another approach with eight blades the hydraulic pistons in an extended position.

FIG. 23E illustrates a top view of the present embodiments according to another approach with twelve blades the hydraulic pistons in an extended position.

Figure 1:
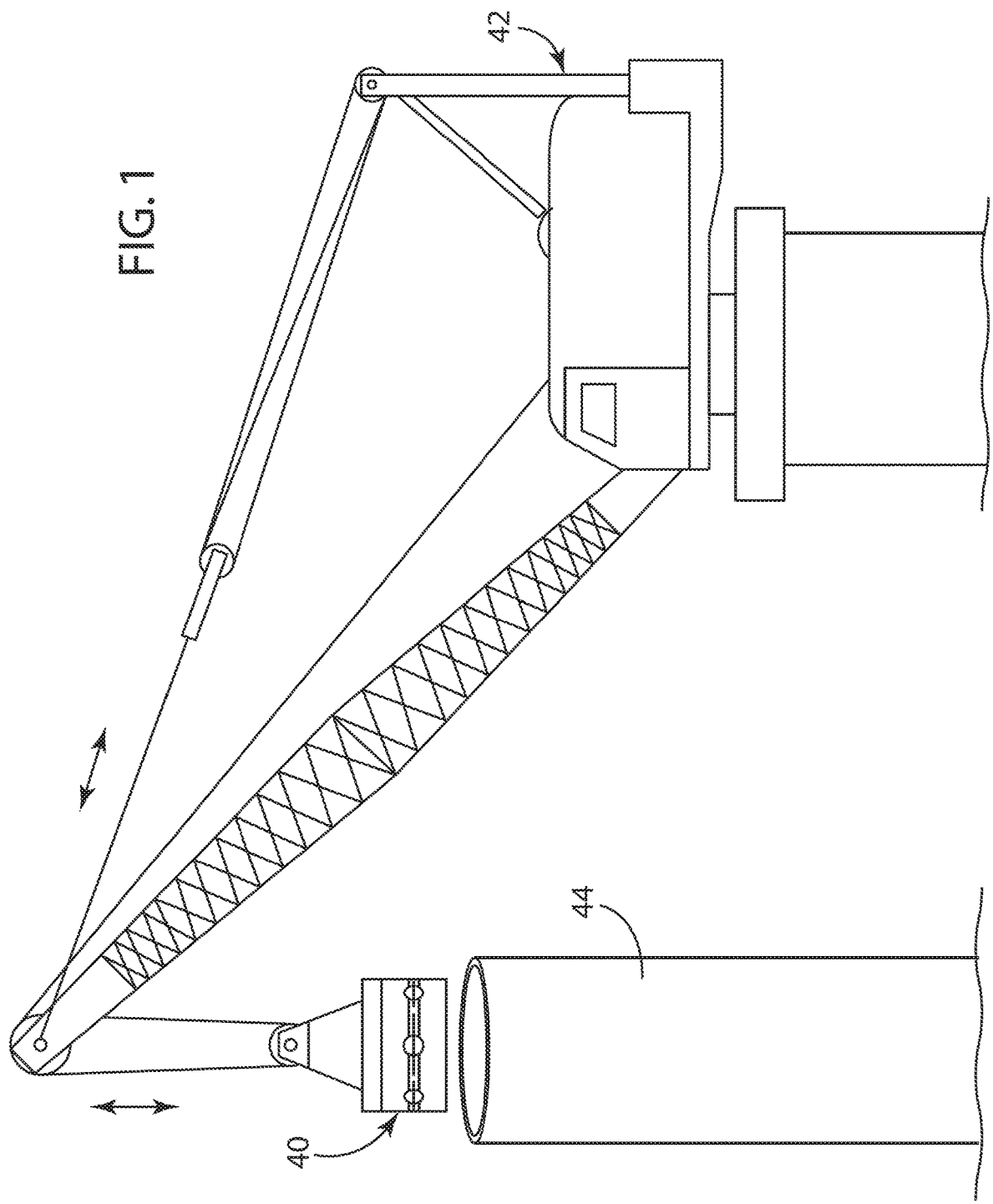
FIG. 1 illustrates a planar view of an internal cutter of one of the present embodiments in use suspended from a crane to be lowered into a hollow piling.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by at least the appended claims.

DETAILED DESCRIPTION

Described herein are assemblies to internally cut pilings and other types of hollow tubes. As shown in the figures, cutting and/or crimping tools are provided with optional assemblies to clamp the tool to the work piece (i.e., the tube of piling) or even to rotate the tool within the workpiece.

FIG. 1 illustrates a planar view of an internal cutter of one of the present embodiments in use suspended from a crane to be lowered into a hollow piling. As shown, a crane 42 may be used to lower the present embodiments 40 within a hollow tube, pile, or pipe 42, such as a metal pipe. The assembly/cutting head 40 should be about 2 inches smaller in its outer diameter than the inner diameter of the tube to be cut. It is also noted that other means of assembly placement are possible, such as pulling the device horizontally through the pipe with a cable.

Figure 2:
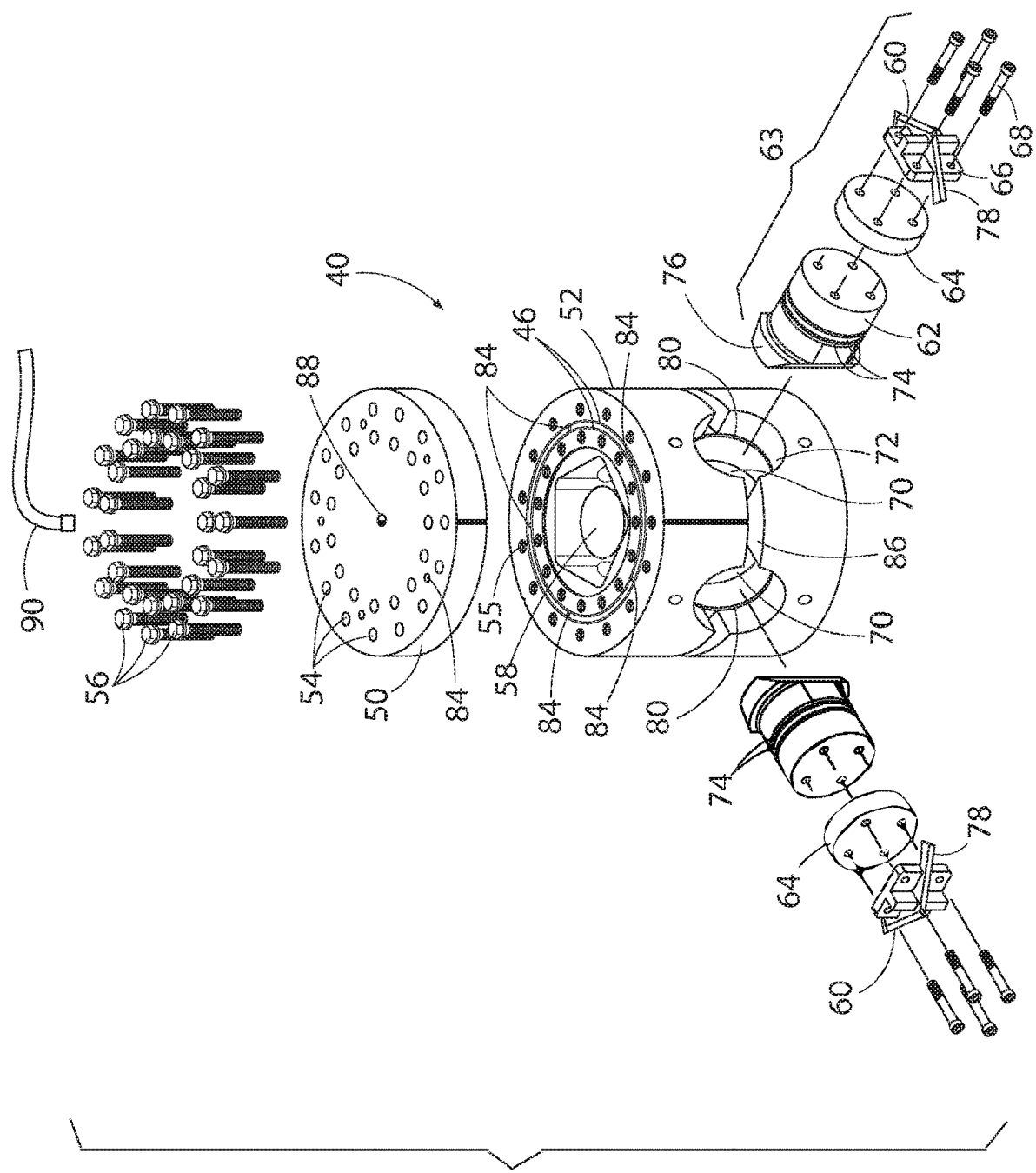
FIG. 2 illustrates an exploded perspective view of an exemplary approach to the present embodiments.
Figure 3:
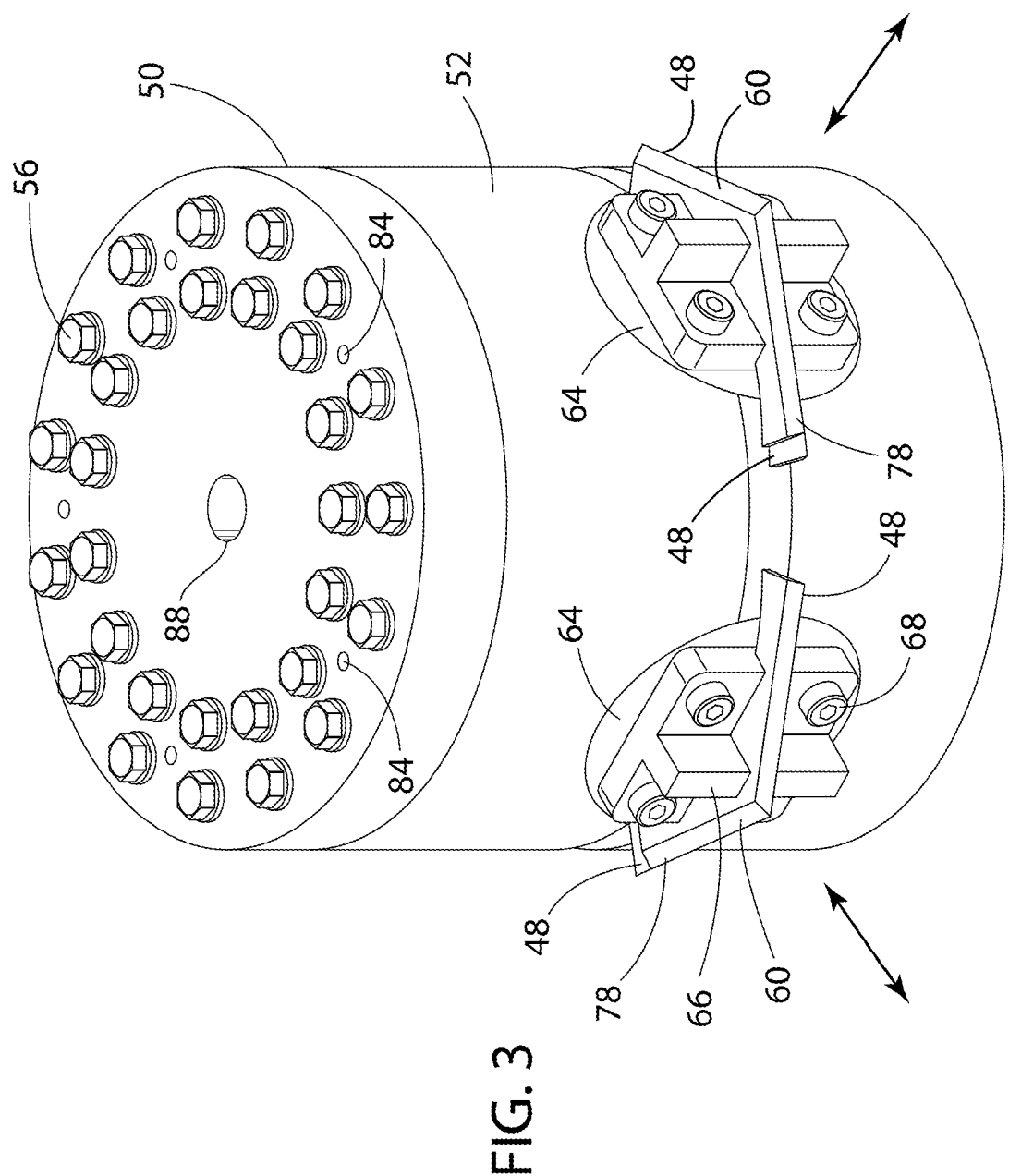
FIG. 3 illustrates an assembled perspective view of the embodiment of FIG. 2.
Figure 4:
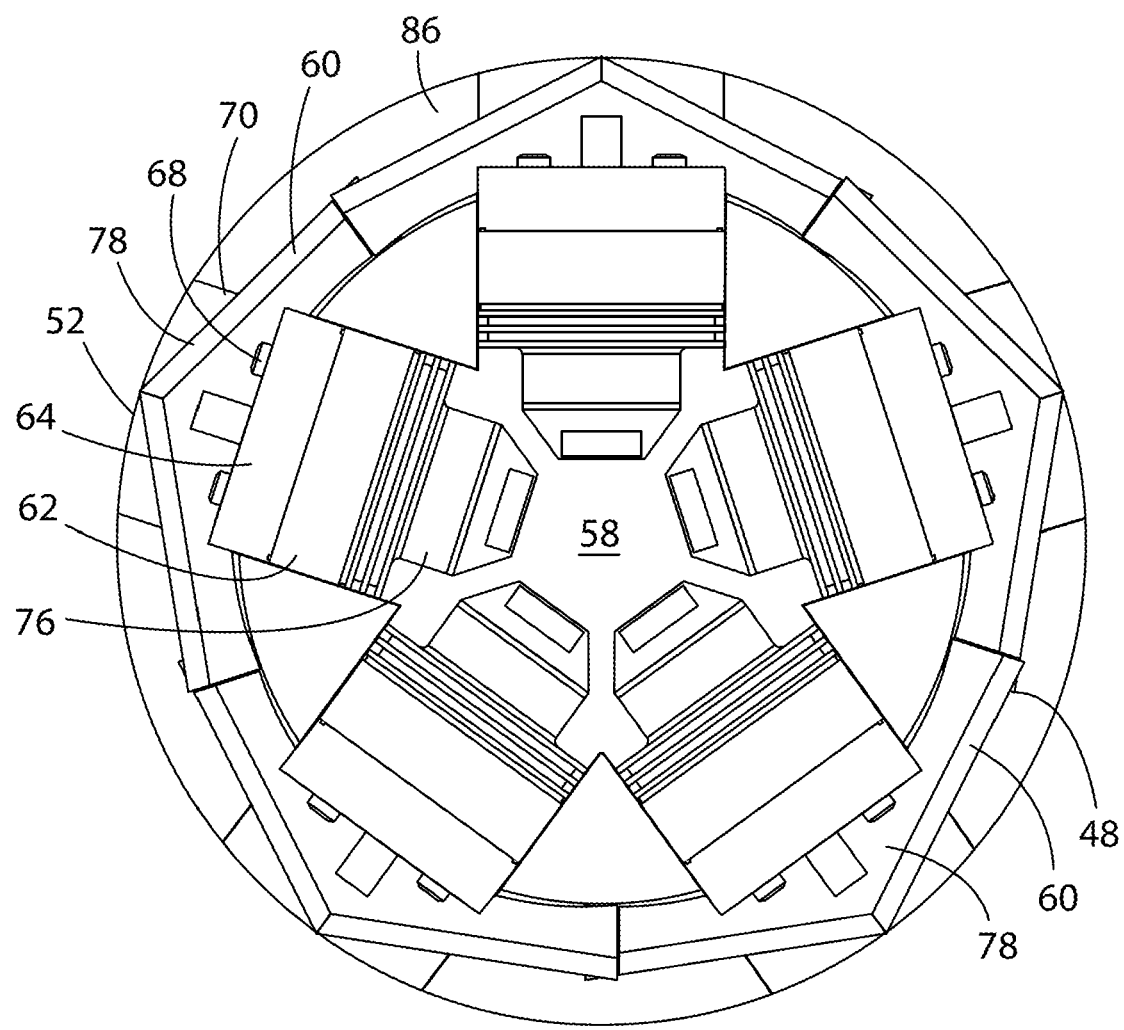
FIG. 4 illustrates a cutaway top view of the embodiment of FIG. 2 with the hydraulic pistons exposed in a retracted position.
Figure 6:
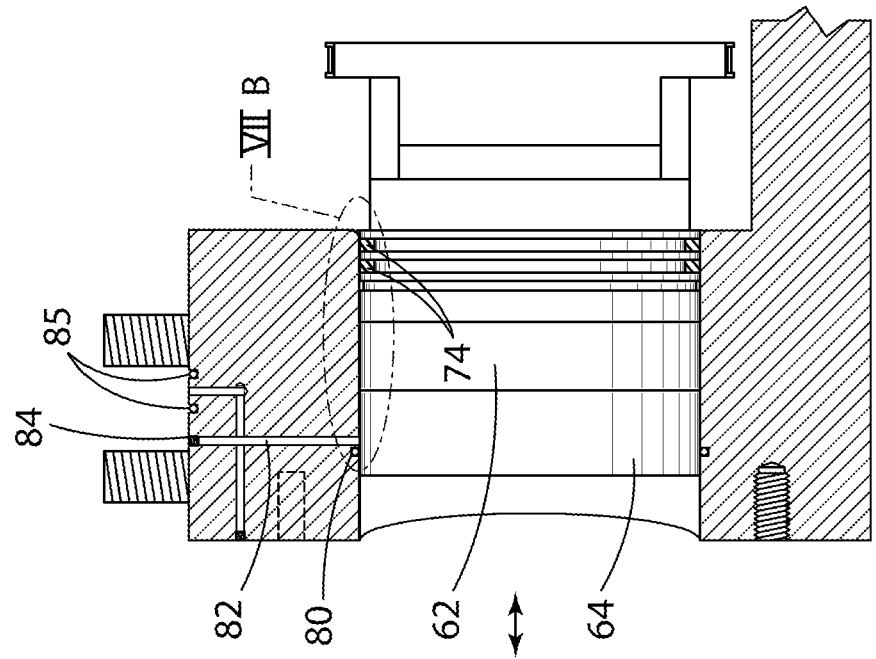
FIG. 6 illustrates a side cutaway view of one of the cylinders of the embodiment of FIG. 2 with the hydraulic piston retracted.
Figure 5:
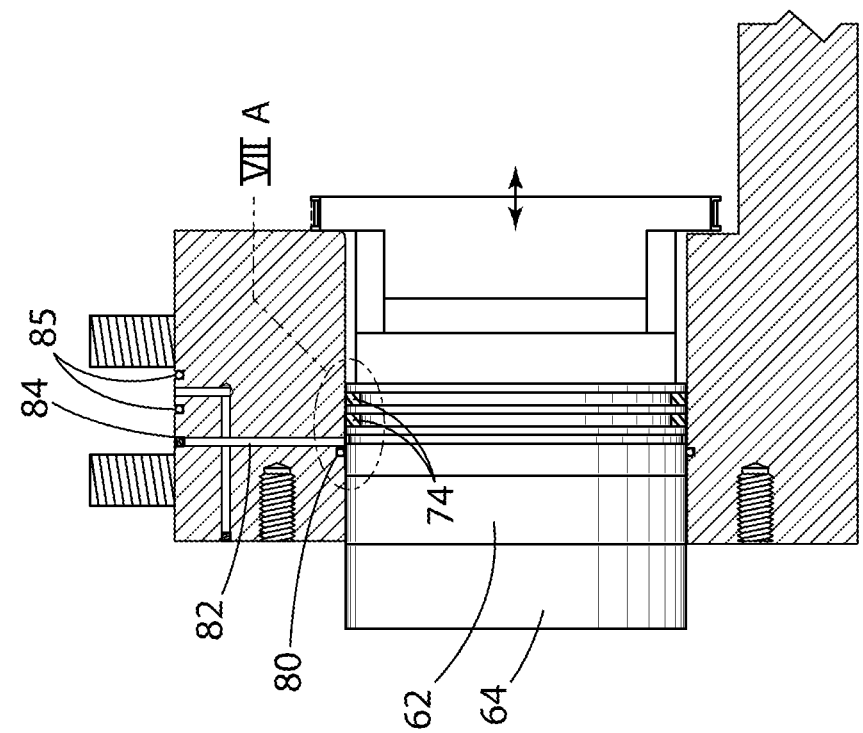
FIG. 5 illustrates a side cutaway view of one of the cylinders of the embodiment of FIG. 2 with the hydraulic piston extended.
Figure 9A:
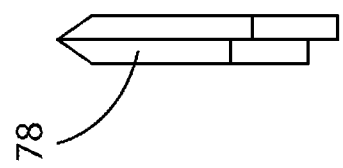
FIG. 9A illustrates a side view of an exemplary cutter of the present embodiments.
Figure 8:
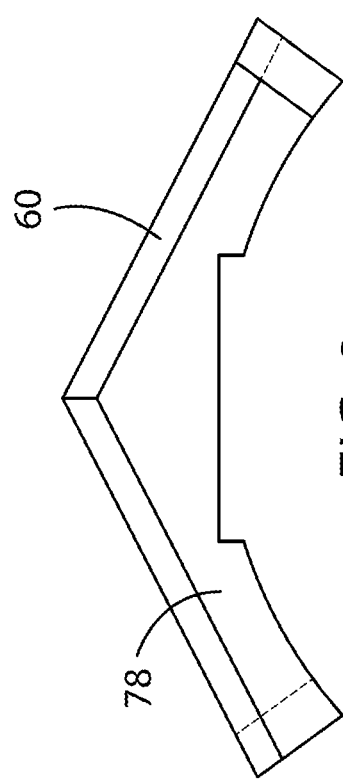
FIG. 8 illustrates a top view of an exemplary cutter of the present embodiments.
Figure 9B:
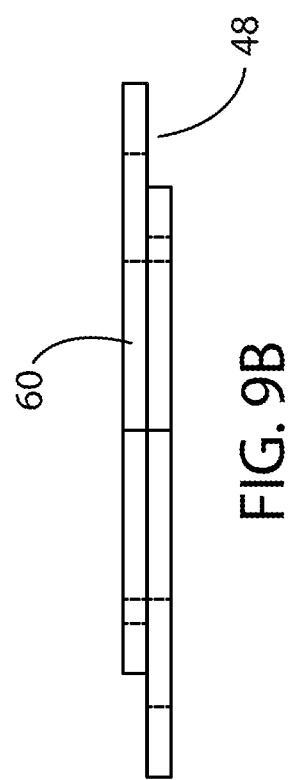
FIG. 9B illustrates a front view of an exemplary cutter of the present embodiments.
Figure 14:
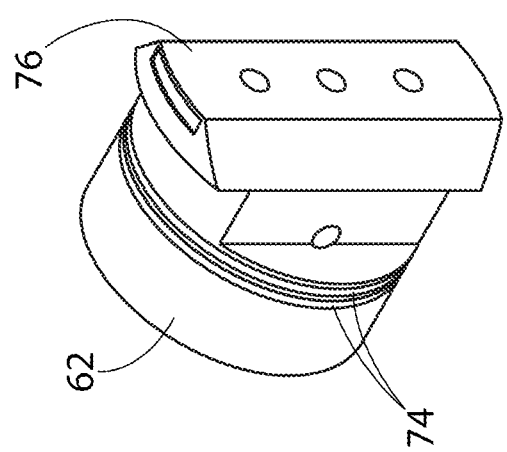
FIG. 14 illustrates a perspective view of an exemplary piston assembly of the present embodiments.
Figure 11:
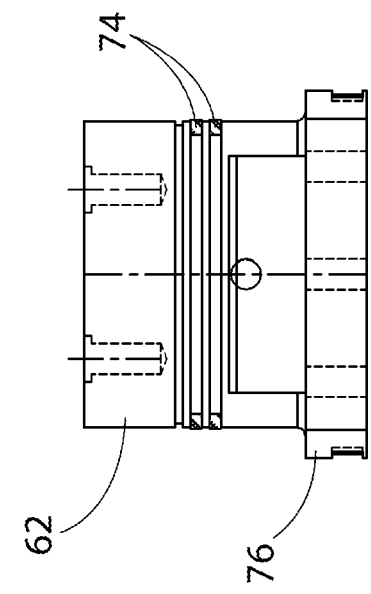
FIG. 11 illustrates a side view of an exemplary piston assembly of the present embodiments.
Figure 13:
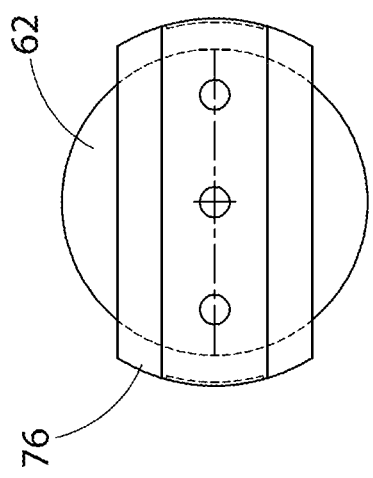
FIG. 13 illustrates a back view of an exemplary piston assembly of the present embodiments.
Figure 10:
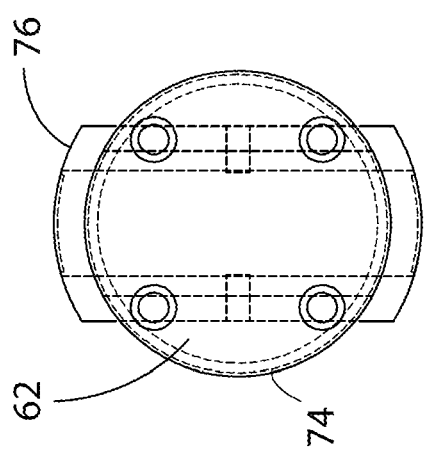
FIG. 10 illustrates a front view of an exemplary piston assembly of the present embodiments.
Figure 12:
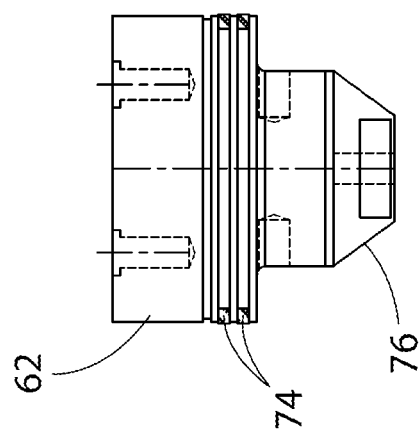
FIG. 12 illustrates a top view of an exemplary piston assembly of the present embodiments.
Figure 15:
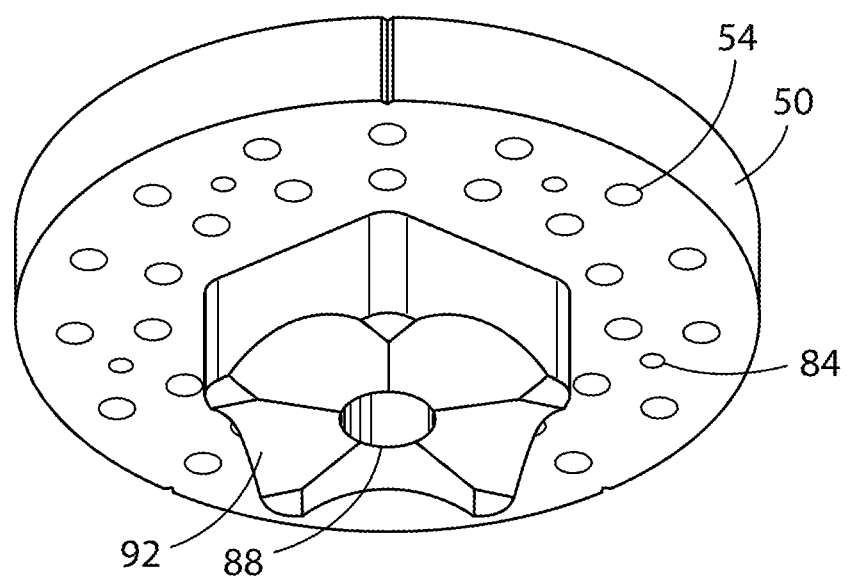
FIG. 15 illustrates a perspective view of an exemplary top plate of the present embodiments.
Figure 18:
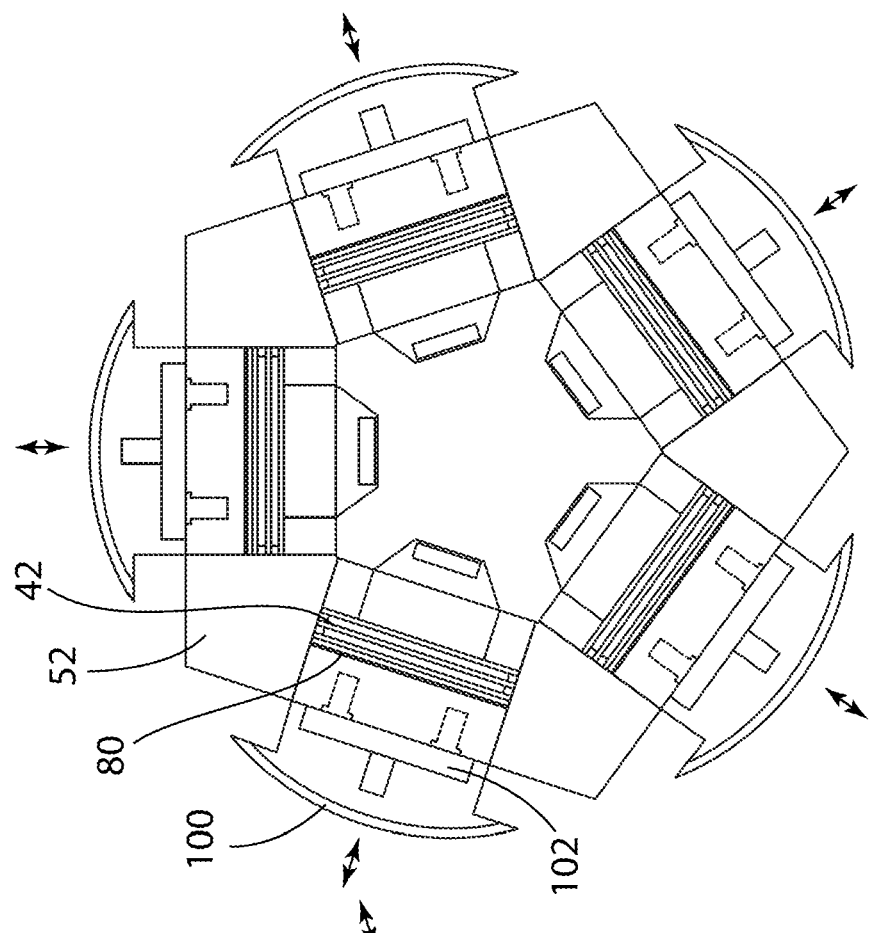
FIG. 18 illustrates a cutaway top view of the present embodiments according to FIG. 17 with the hydraulic pistons exposed in an extended position.
Figure 17:
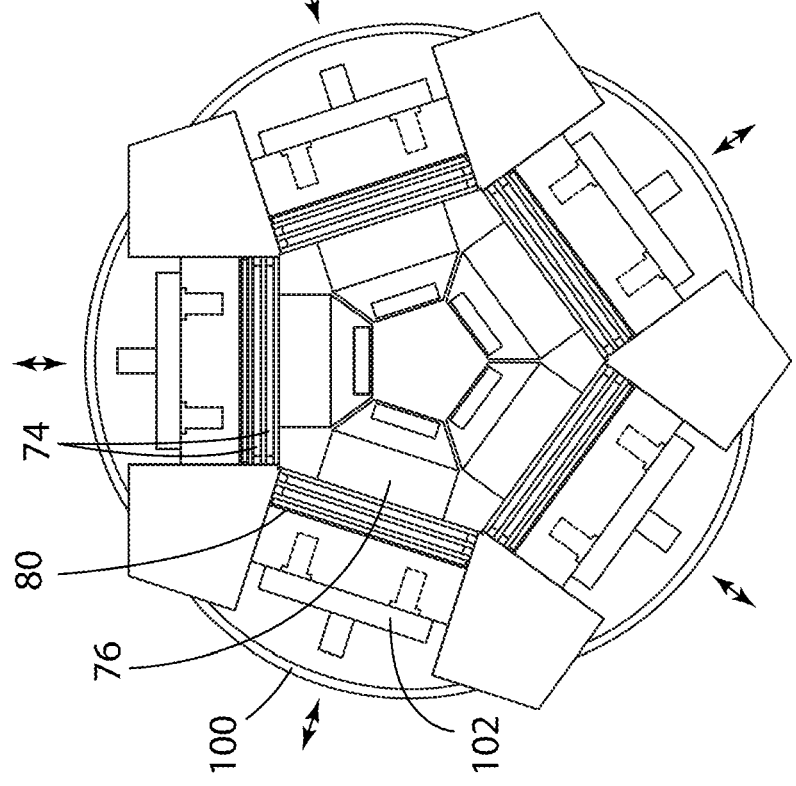
FIG. 17 illustrates a cutaway top view of the present embodiments according to another approach with the hydraulic pistons exposed in a retracted position.
Figure 19:
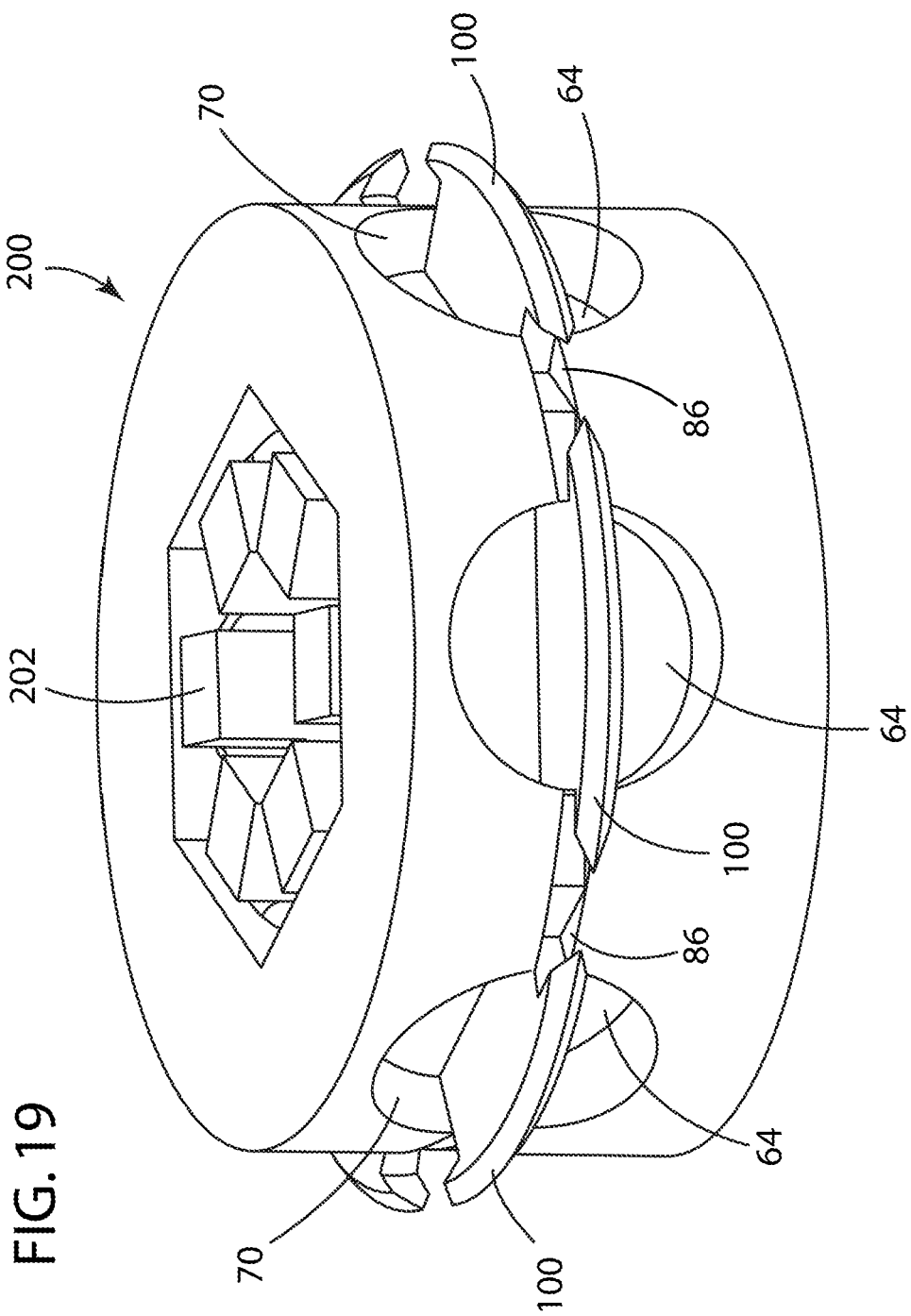
FIG. 19 illustrates a perspective view of the present embodiments according to FIG. 17 with the hydraulic pistons exposed in an extended position.
Figure 20:
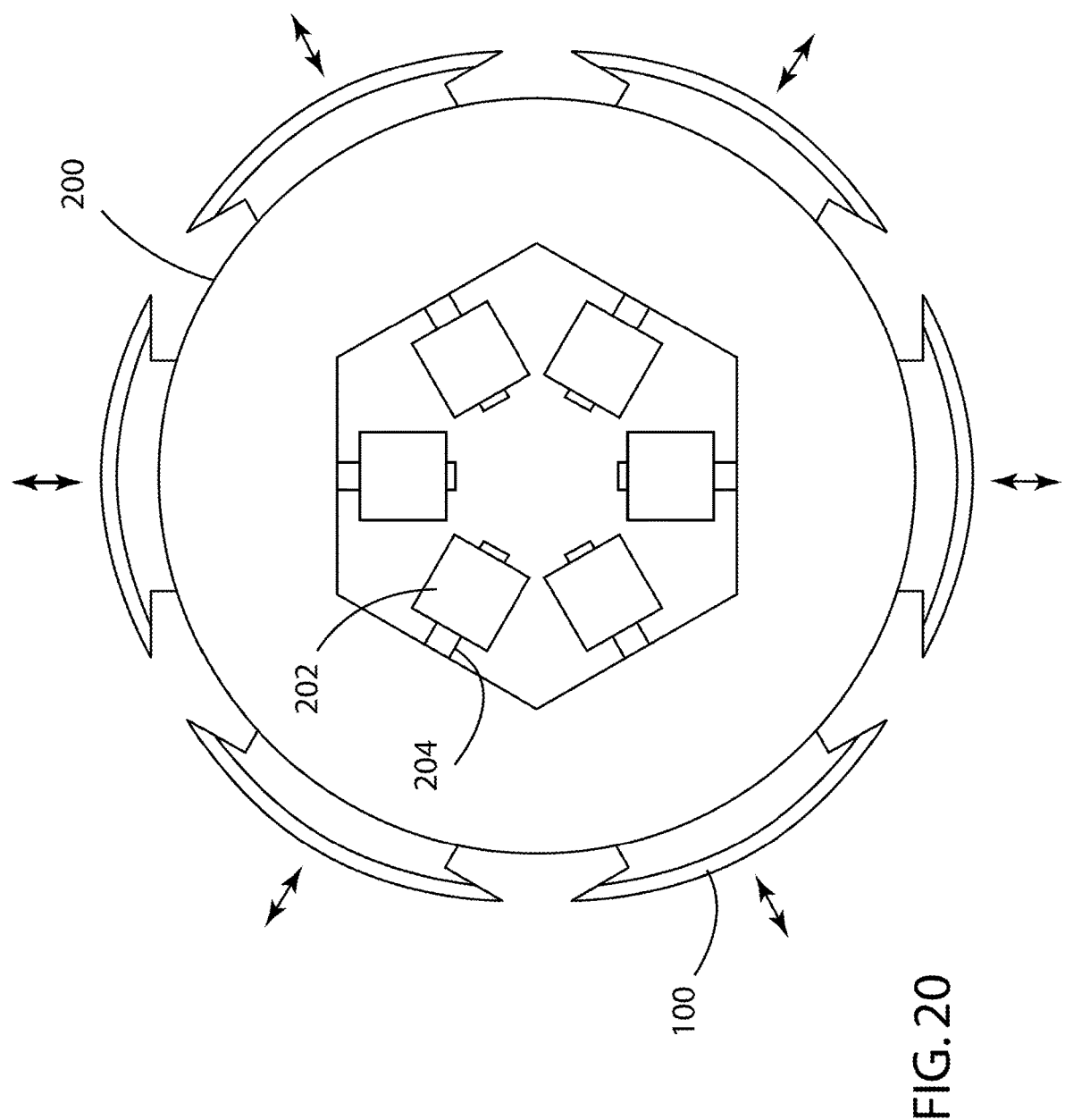
FIG. 20 illustrates a top view of the present embodiments according to another approach with six blades the hydraulic pistons in an extended position.
Figure 21:
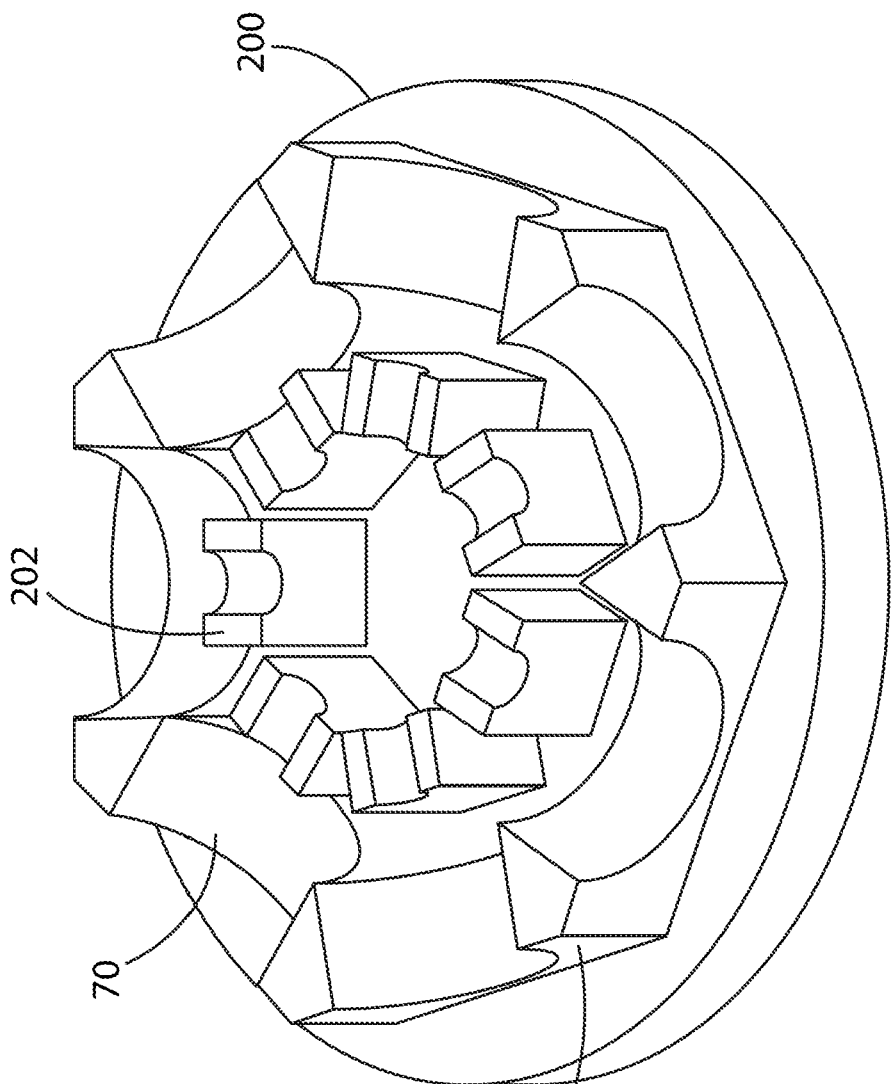
FIG. 21 illustrates a perspective view of a cutaway casing cavity showing the bottom half of the casing of the present embodiments according FIG. 20.
Figure 22:
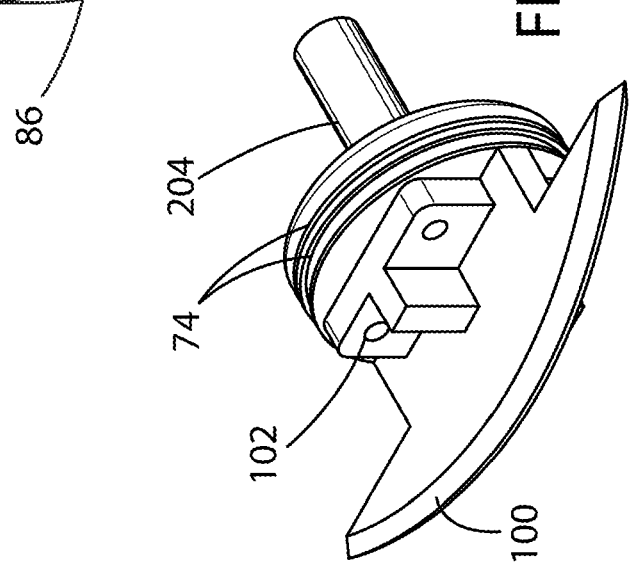
FIG. 22 illustrates a perspective view of a piston/blade assembly of the present embodiments according FIG. 20.
Figure 24:
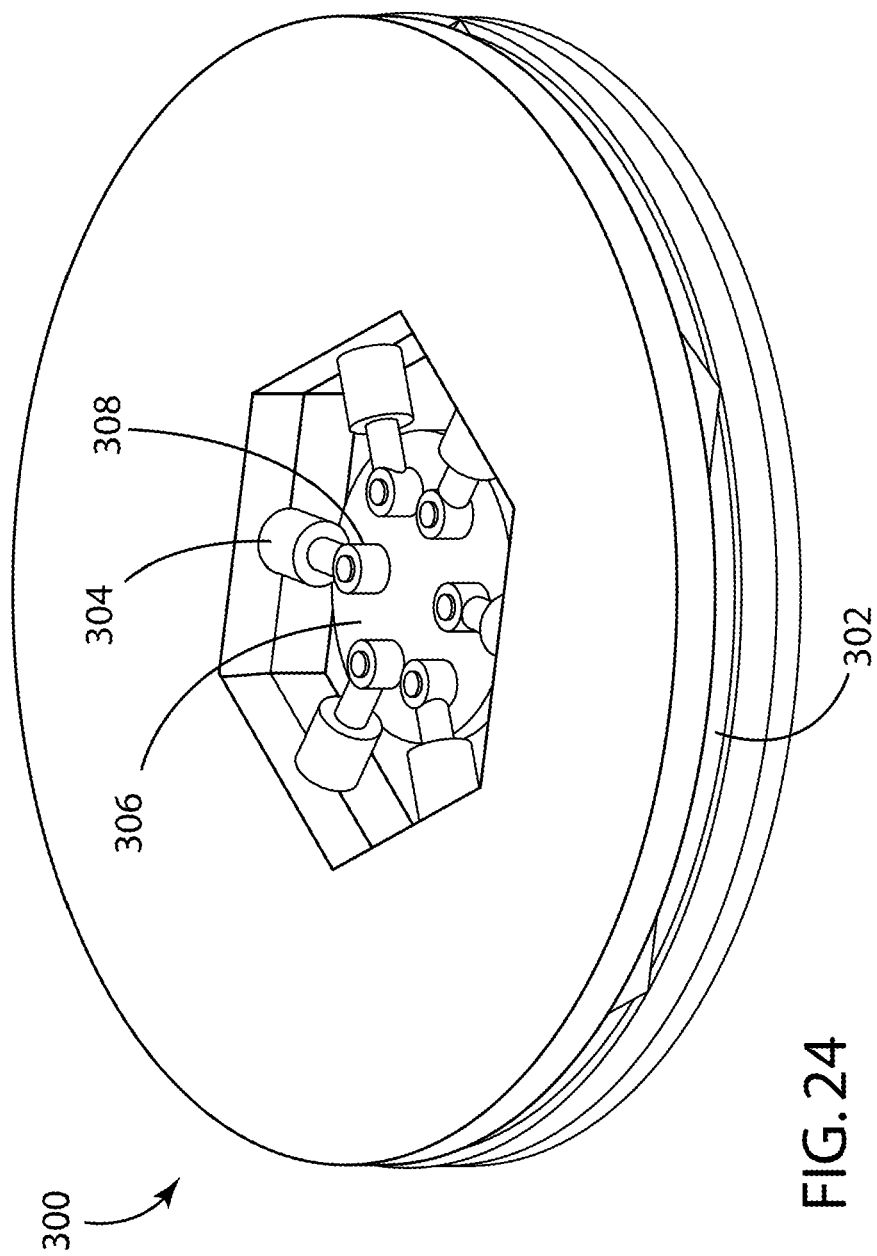
FIG. 24 illustrates a perspective view of the present embodiments according to another approach with six arched blades attached to 6 individual hydraulic pistons in a retracted position.
Figure 25:
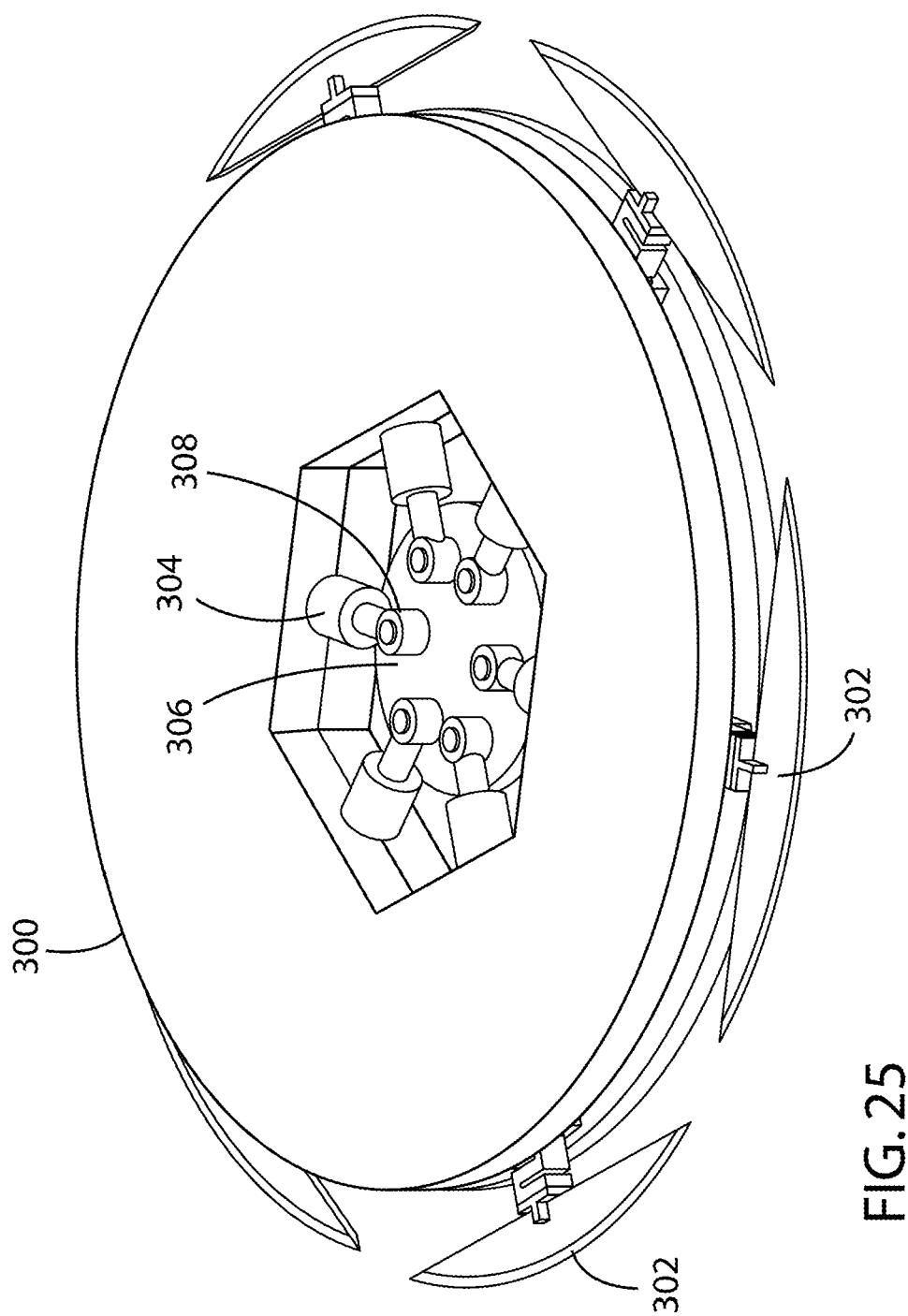
FIG. 25 illustrates a perspective view of the present embodiments according FIG. 25 with six arched blades attached to 6 individual hydraulic pistons in an extended position.
Figure 26:
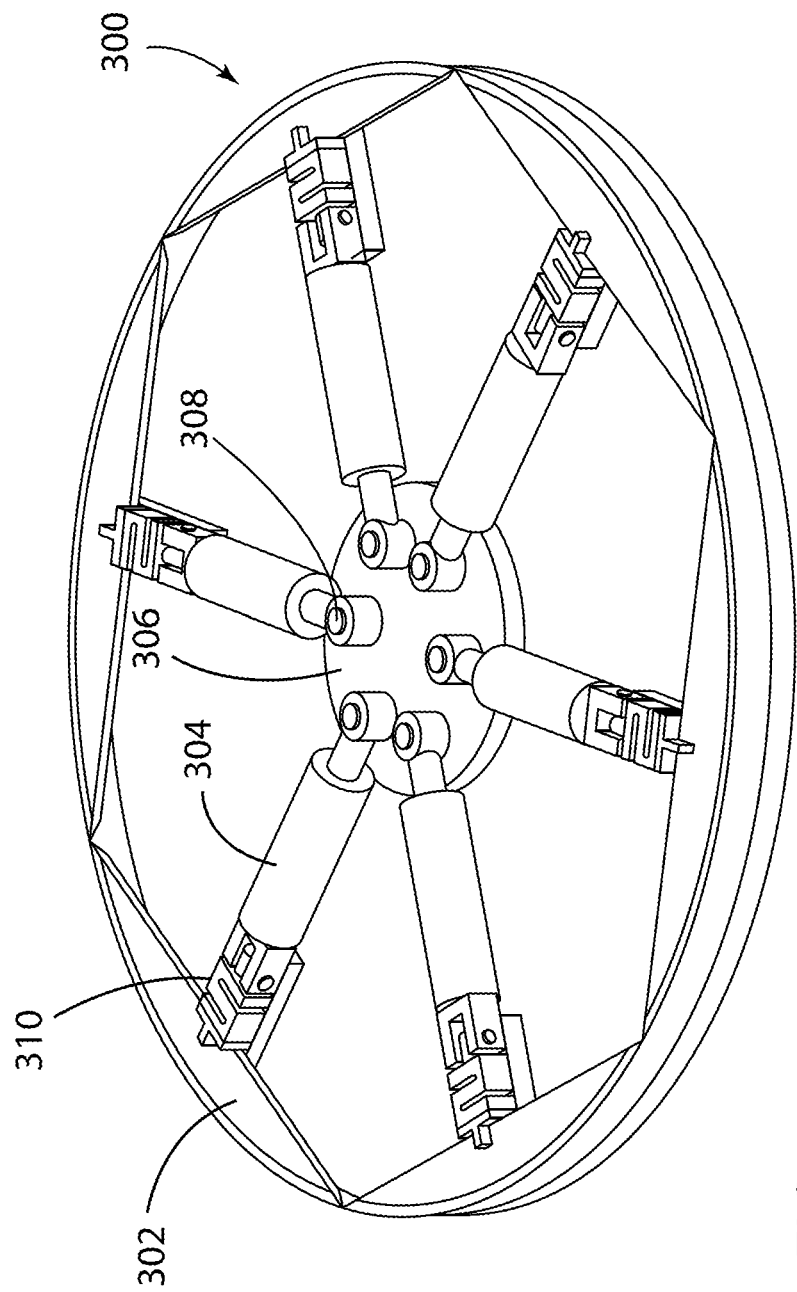
FIG. 26 illustrates a cutaway top view of the present embodiments according to FIG. 24 with the hydraulic pistons exposed in a retracted position.
Figure 27:
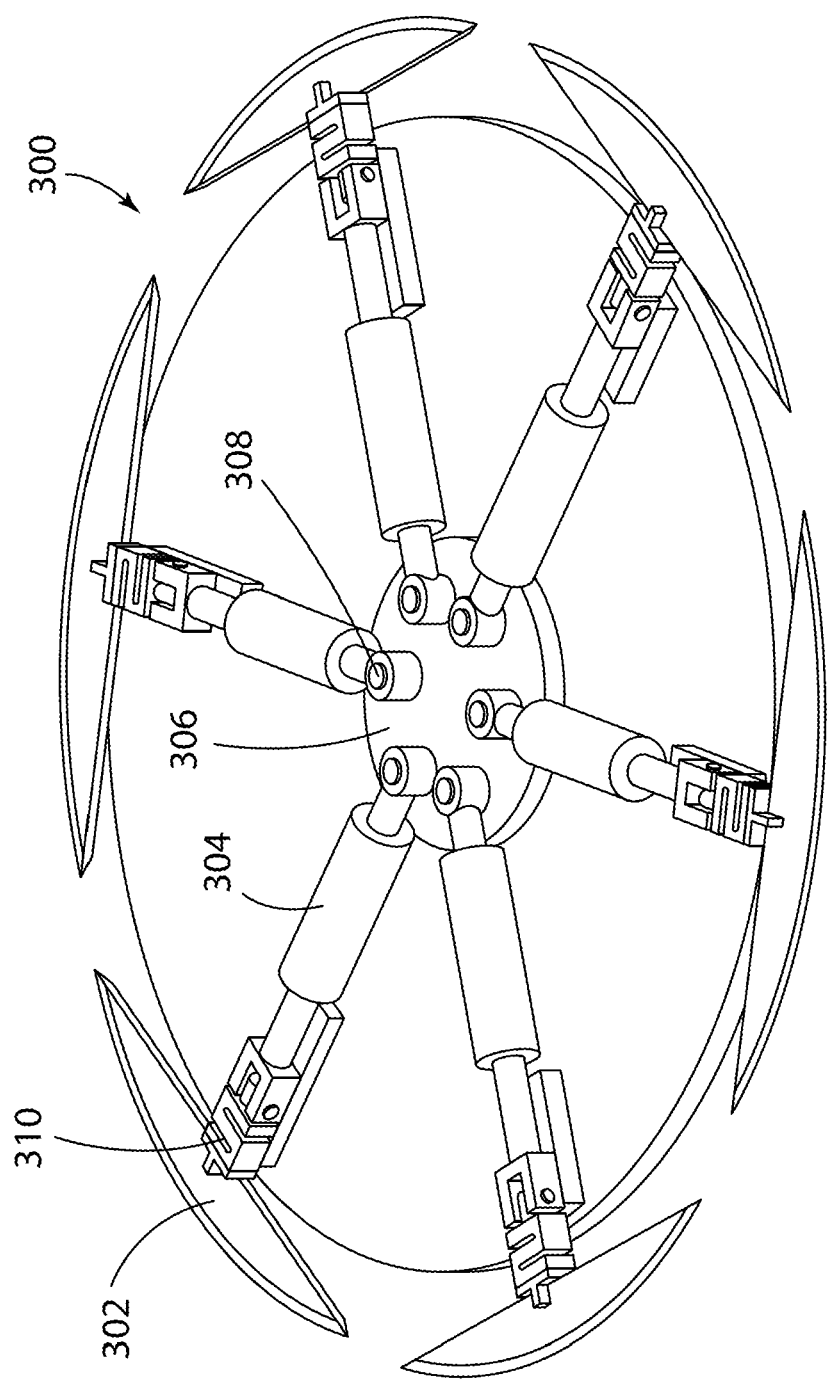
FIG. 27 illustrates a cutaway top view of the present embodiments according to FIG. 24 with the hydraulic pistons exposed in an extended position.

FIGS. 2 and 3 illustrate an exploded and assembled perspective view of an exemplary approach to the present embodiments, which have component parts shown in more detail in FIGS. 4-15. Cutting head 40 may have at least one housing O-ring and channel to withstand up to about 10,000 PSI 46; cutter step to allow overlap in retracted position 48 (See FIGS. 4 and 8-9); a top plate 50; a main casing 52; openings 54 for bolts 56 to clamp top plate 55 to casing 52; threaded holes 55 to received bolts 56; bolts or other connectors to clamp top plate onto the casing 56, again configured to withstand up to about 10,000 PSI; a casing cavity to receive hydraulic fluid 58 under pressure up to about 10,000 PSI; blade 60 hardened steel or other material to cut through at least a 1 inch thick metal plate and otherwise withstand the force from the piston without deforming or otherwise damaging the blade edge; rounded edge 61 in lieu of a blade (see FIG. 16B) to crimp or deform the pile, such as to hold a pipe within a pipe; piston head 62 as part of an exemplary; piston/cutter assembly 63; an optional piston cutter plate 64 used for extensions or to otherwise set the final stroke distance of the piston; a cuter mounting bracket 66; bolts to mount cutter onto cylinder 68, again sized and shaped to maintain the integrity of the housing cavity under pressure; a cylinder wall 70; hydraulic fluid 72; cylinder seals 74; a rear plate for cylinder acts as a stop 76; piston cutter bracket 78; fixed seal 80 within cylinder wall 70; opening 84 to mount second hydraulic line 82, which is a conduit through top plate and casing for hydraulic fluid to push back pistons to retracted position; O-rings 85; stop for retracted cutter 86; opening 88 in top plate 50 to mount hydraulic hose 90; hydraulic hose 90; cylinder wall 92 mate to top plate 50.

FIG. 16A illustrates a perspective view of an exemplary cutter edge bracket 102 of the present embodiments according to another approach with an arched blade 100.

FIG. 16B illustrates a perspective view of an exemplary cutter bracket 102 of the present embodiments according to another approach with a rounded edge 61 to allow crimping.

FIGS. 17-22 he arched edge embodiment with alternate features to guide the piston through the cylinder wall. In this alternate configuration, a piston may have a shaft guided within the casing cavity 200; guide blocks 202 (upper and lower, which can be connected by, for example, bolts) to guide internal piston shaft 204. FIGS. 23A-E illustrate top views of the present embodiments according to another approach with two blades the hydraulic pistons in an extended position.

FIG. 24-27 illustrate a perspective view of the present embodiments according to another approach with six arched blades attached to up to 6 individual hydraulic pistons 304. As shown, these embodiments 300 may have cutters 302; hydraulic cylinders 304; a plate to mount hydraulic cylinders 306; a mount of plate to hydraulic cylinders 308; and an optional pressure sensor 310

Figure 28:
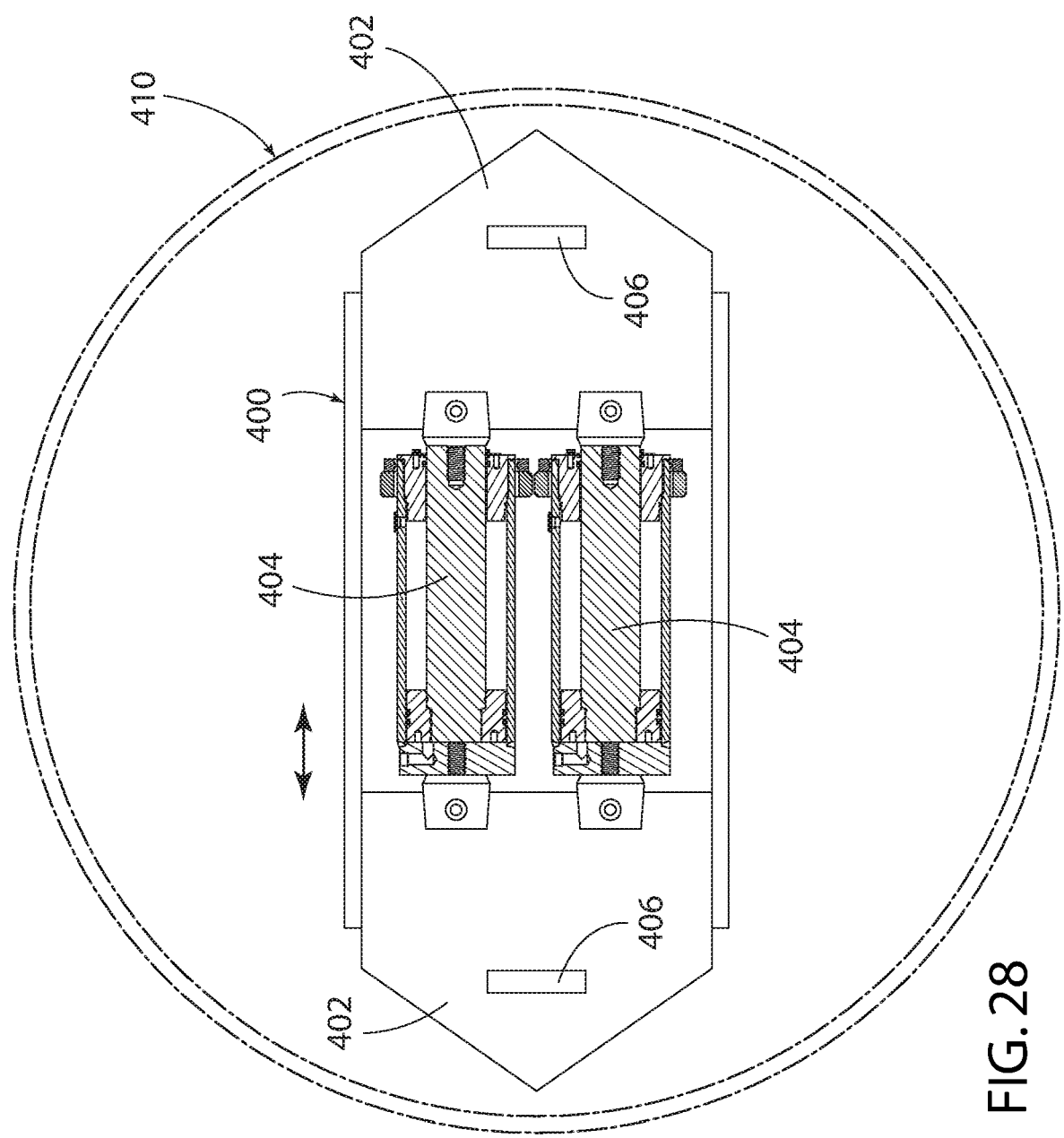
FIG. 28 illustrates a top view of the present embodiments according to another approach with two opposed blades attached to a pair of hydraulic pistons in a retracted position.
Figure 29:
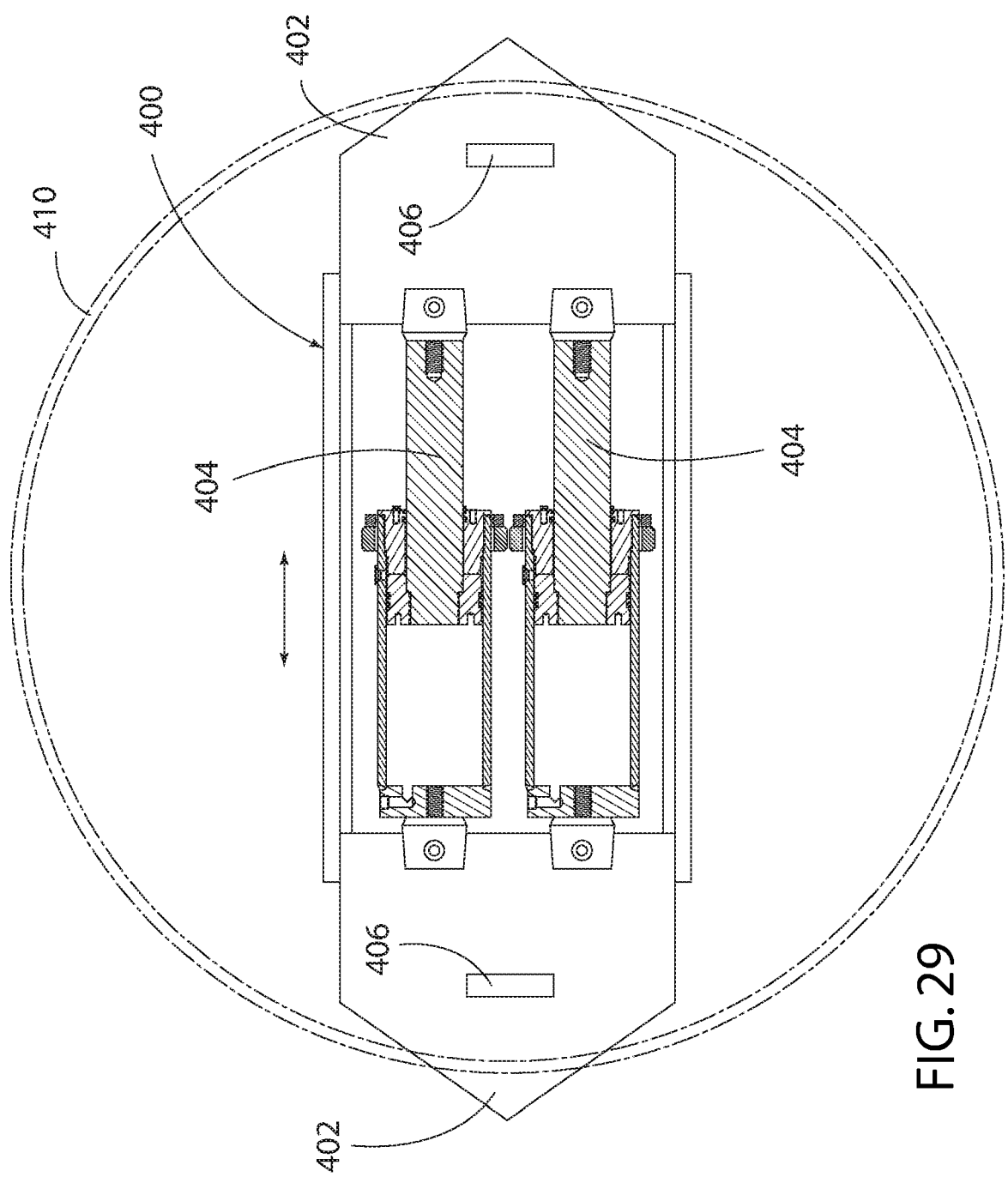
FIG. 29 illustrates a top view of the present embodiments according to FIG. 28 with two opposed blades attached to a pair of hydraulic pistons in an extended position.
Figure 30:
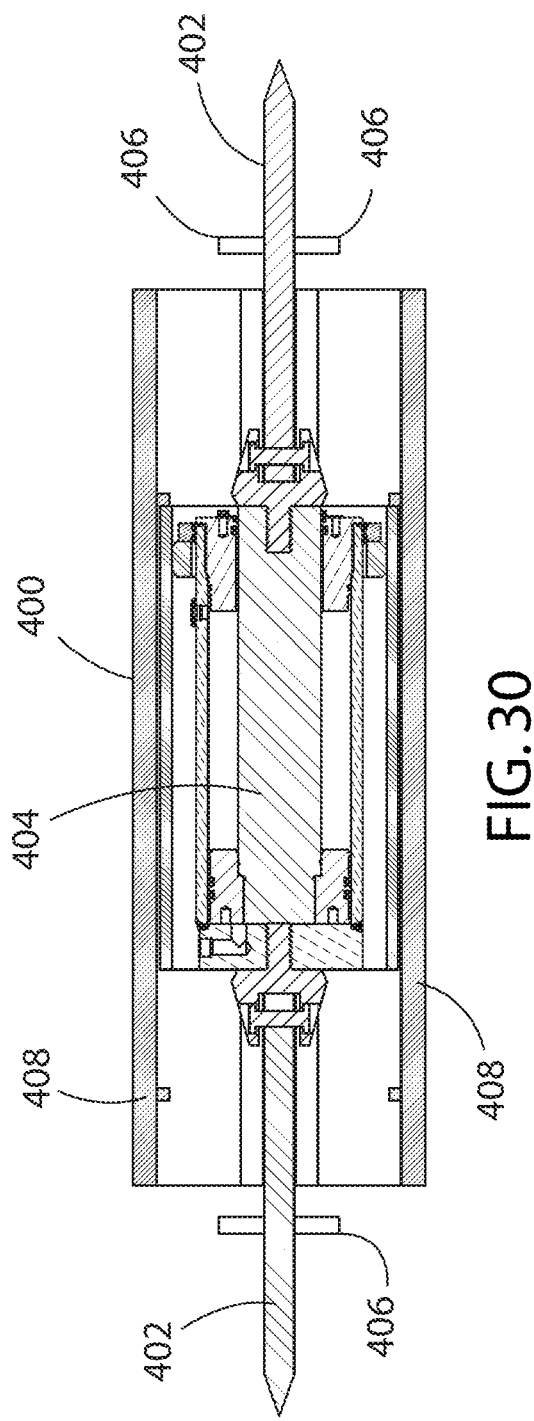
FIG. 30 illustrates a top view of the present embodiments according to FIG. 28 with two opposed blades attached to a pair of hydraulic pistons in a retracted position.
Figure 31:
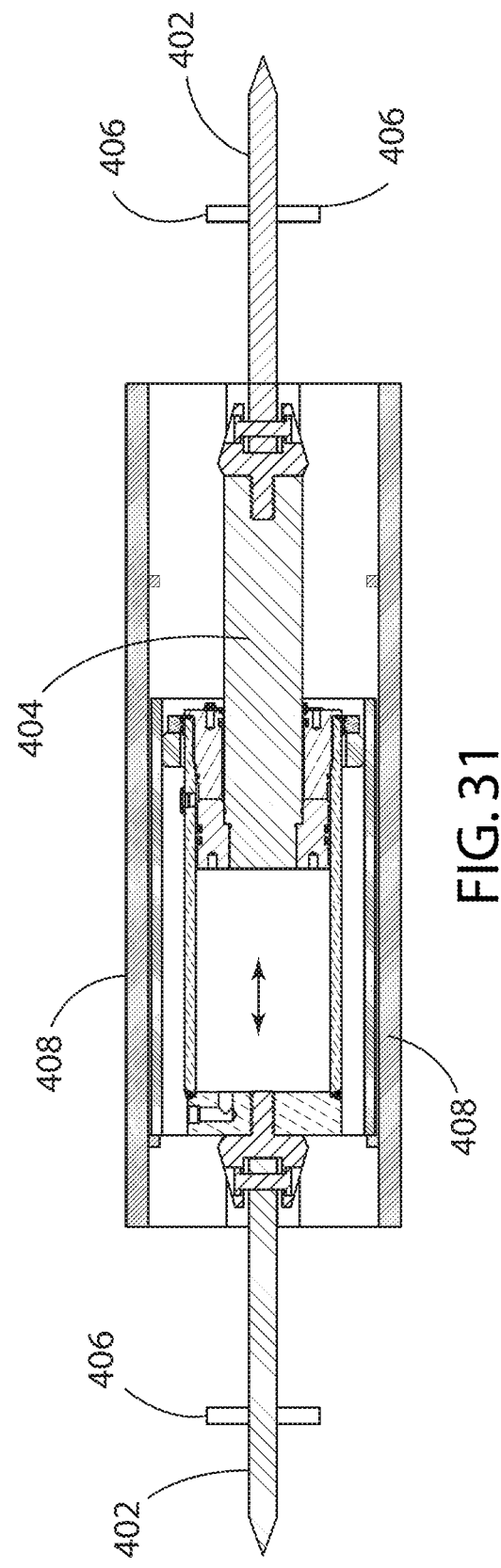
FIG. 31 illustrates a side view of the present embodiments according to FIG. 28 with two opposed blades attached to a pair of hydraulic pistons in an extended position.

FIGS. 28-31 illustrates a top view of the present embodiments according to another approach 400 with two opposed blades attached to a pair of hydraulic pistons, shown in a retracted position in FIG. 28 with multiple hydraulic cylinders 404 connected to each blade 402. As shown, these embodiments can have a cutter 402, a hydraulic cylinder 404, a stop 406, housing plates 408 to cut a pipe 410.

Figure 32:
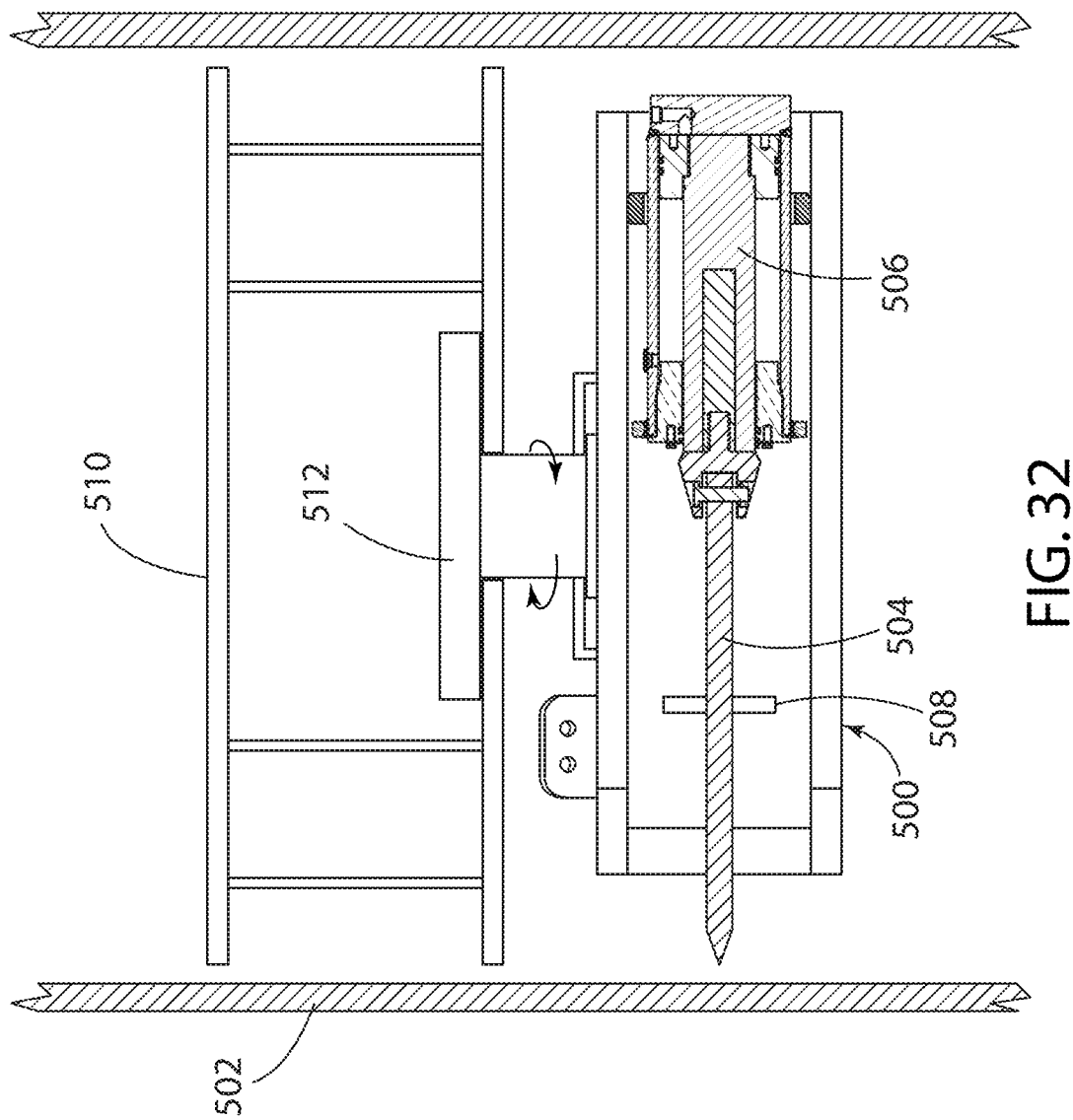
FIG. 32 illustrates a side view of the present embodiments according to another approach with a single rotatable blade and hydraulic pistons in a retracted position.

FIG. 32 illustrates a side view of the present embodiments according to another approach with a single rotatable blade and hydraulic pistons in a retracted position. As shown, this embodiment 500 can have be used to cut a pipe 502 with a cutter 504 using a hydraulic cylinder 506, a stop 508, a mounting platform 510 on a rotatable mount 512. In this embodiment a pipe can be cut in multiple steps of make one cut, rotating the piston/cutter assembly, making another cut, and so on until the entire circumference of the pipe has been cut.

Figure 33:
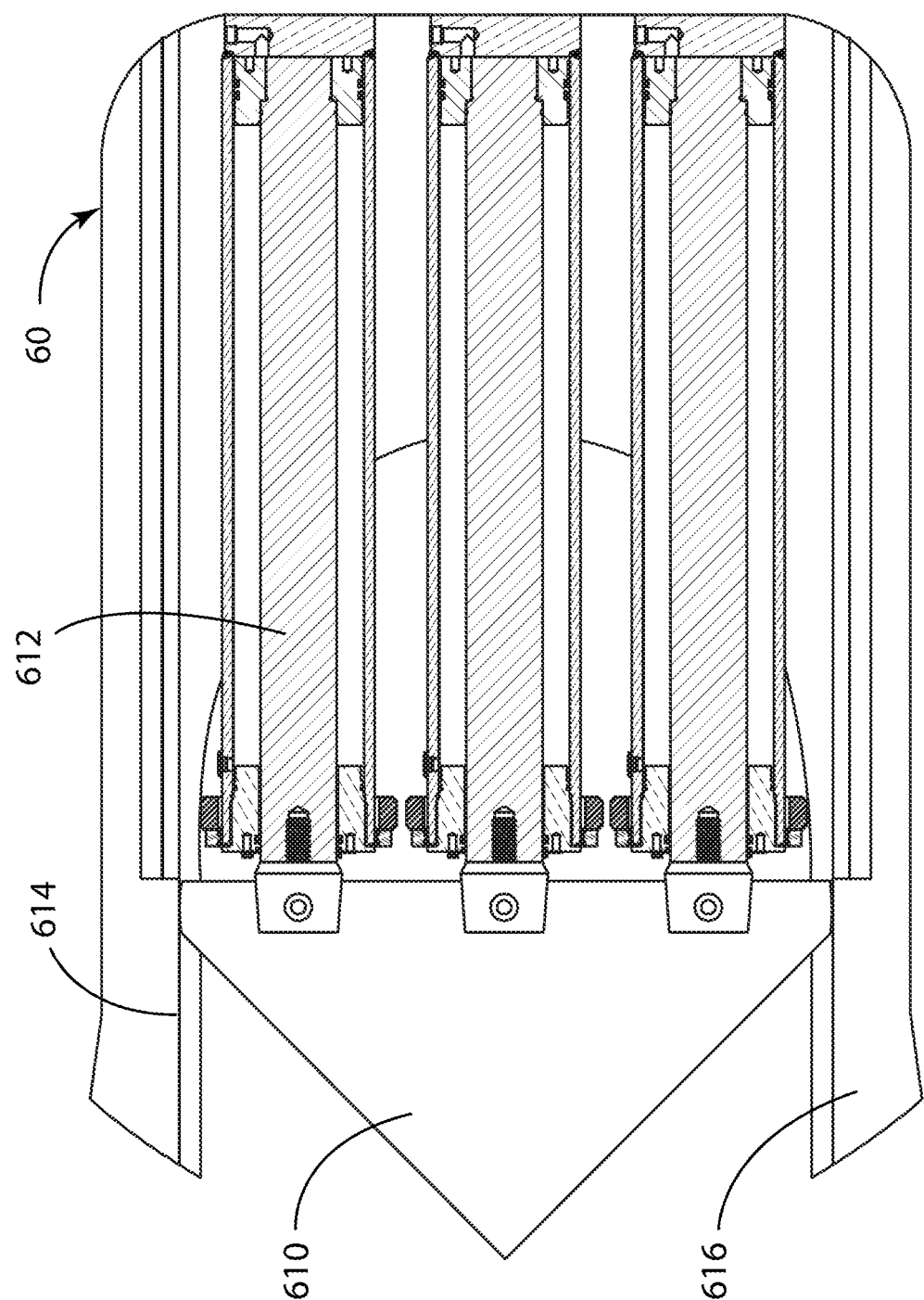
FIG. 33 illustrates a top view of the present embodiments according to another approach with a single blade attached to three hydraulic pistons in a retracted position.

FIG. 33 illustrates a top view of the present embodiments according to another approach with a single blade attached to three hydraulic pistons in a retracted position. In this embodiment 600, multiple hydraulic cylinders per blade 610 can be used connected to hydraulic cylinders 612 moved along a track for cutter 614 disposed within a frame 616 to hold cylinders and cutter.

Figure 34:
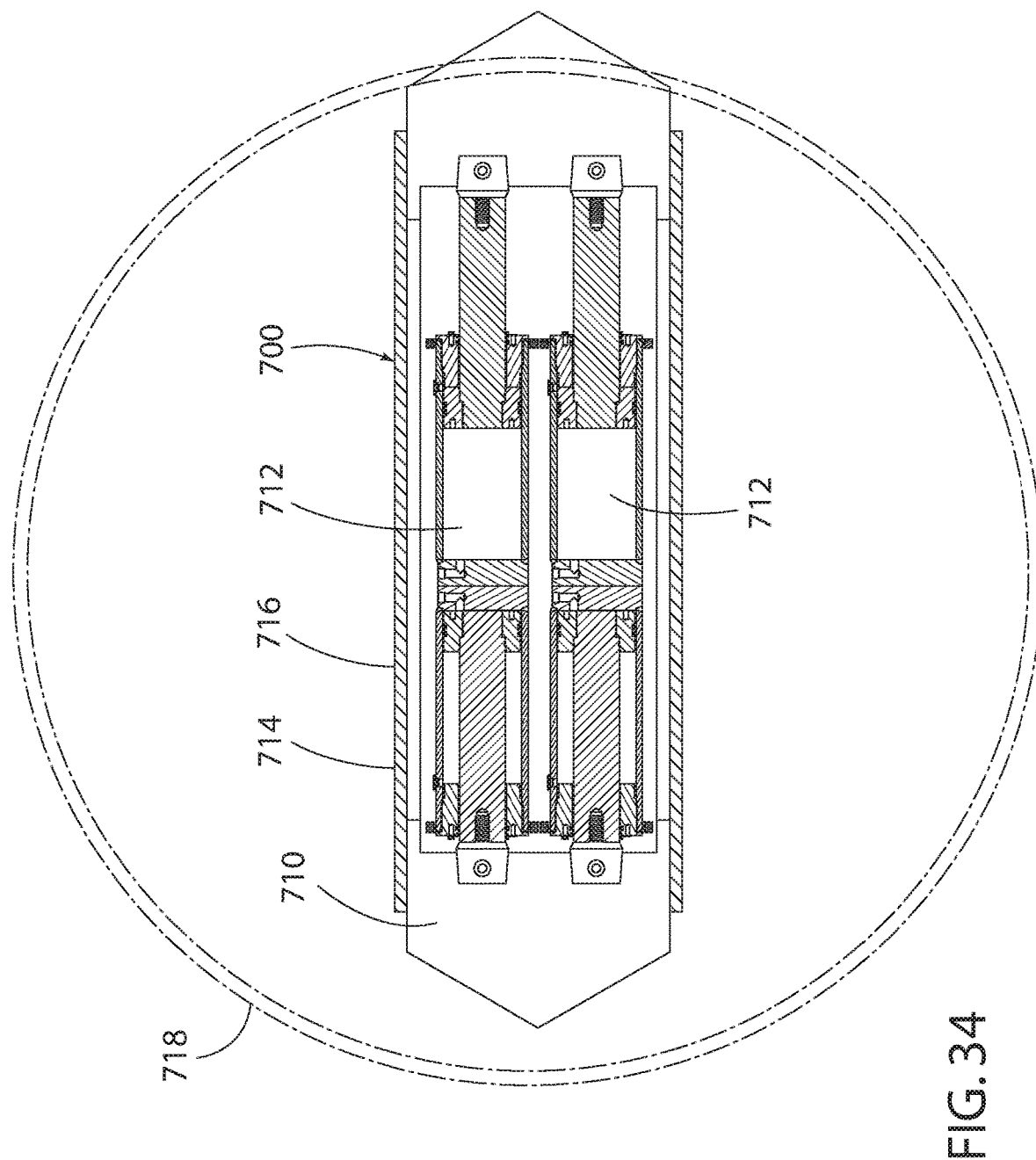
FIG. 34 illustrates a top view of the present embodiments according to another approach with two opposed blades attached to a pair of hydraulic pistons in a partially extended position.

FIG. 34 illustrates a top view of the present embodiments according to another approach with two opposed blades attached to a pair of hydraulic pistons in a partially extended position. In this embodiment, multiple hydraulic cylinders per opposing blade pair 700 can have a cutter blade 710, hydraulic cylinders 712, track for cutter 714, and frame to hold cylinders and cutter 716 to cut pipe 718.

Figure 35:
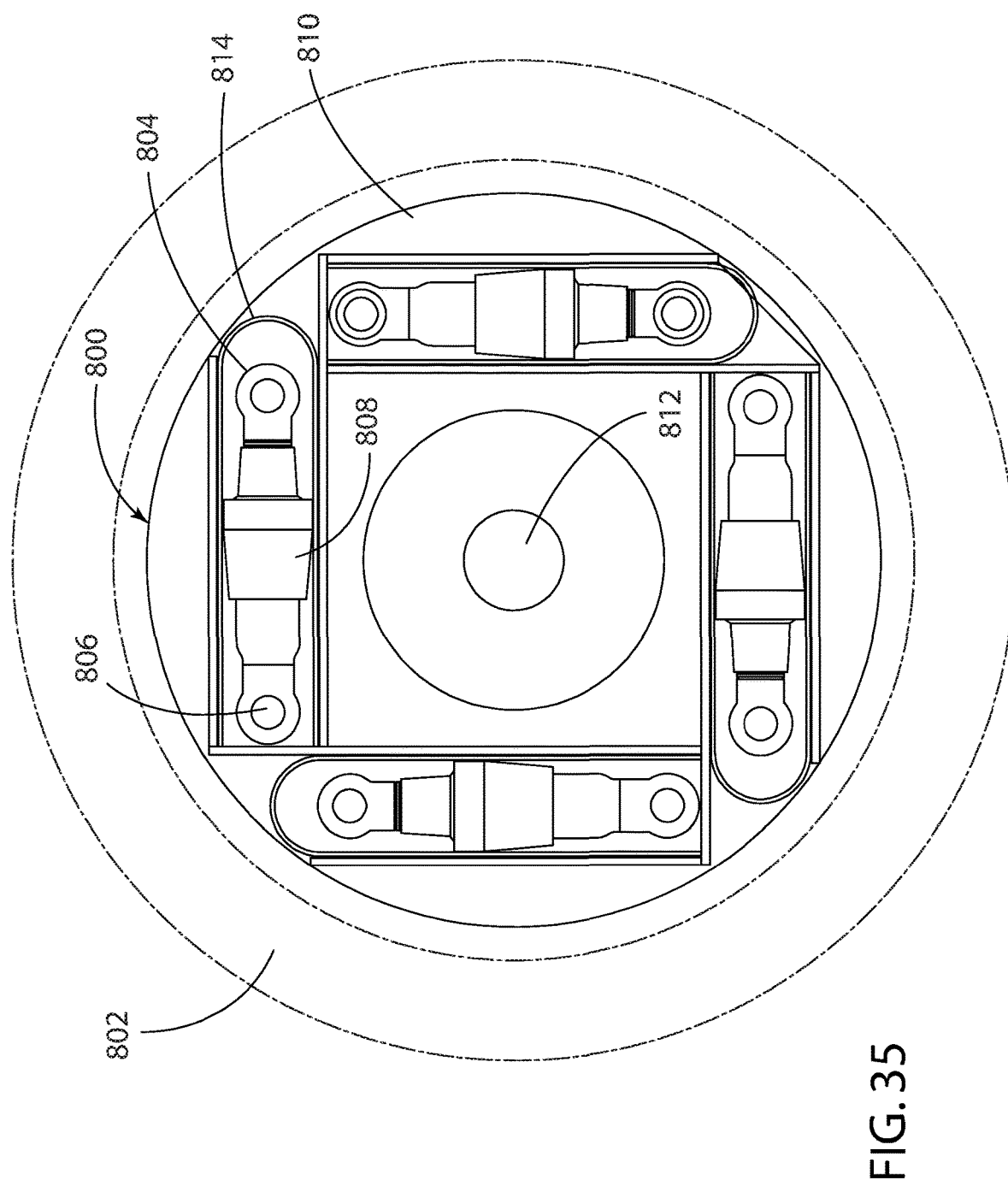
FIG. 35 illustrates a top view of an optional clamping and/or rotating assembly of the present embodiments in a retracted position.

FIG. 35 illustrates a top view of an optional clamping and/or rotating assembly of the present embodiments in a retracted position.

Figure 36:
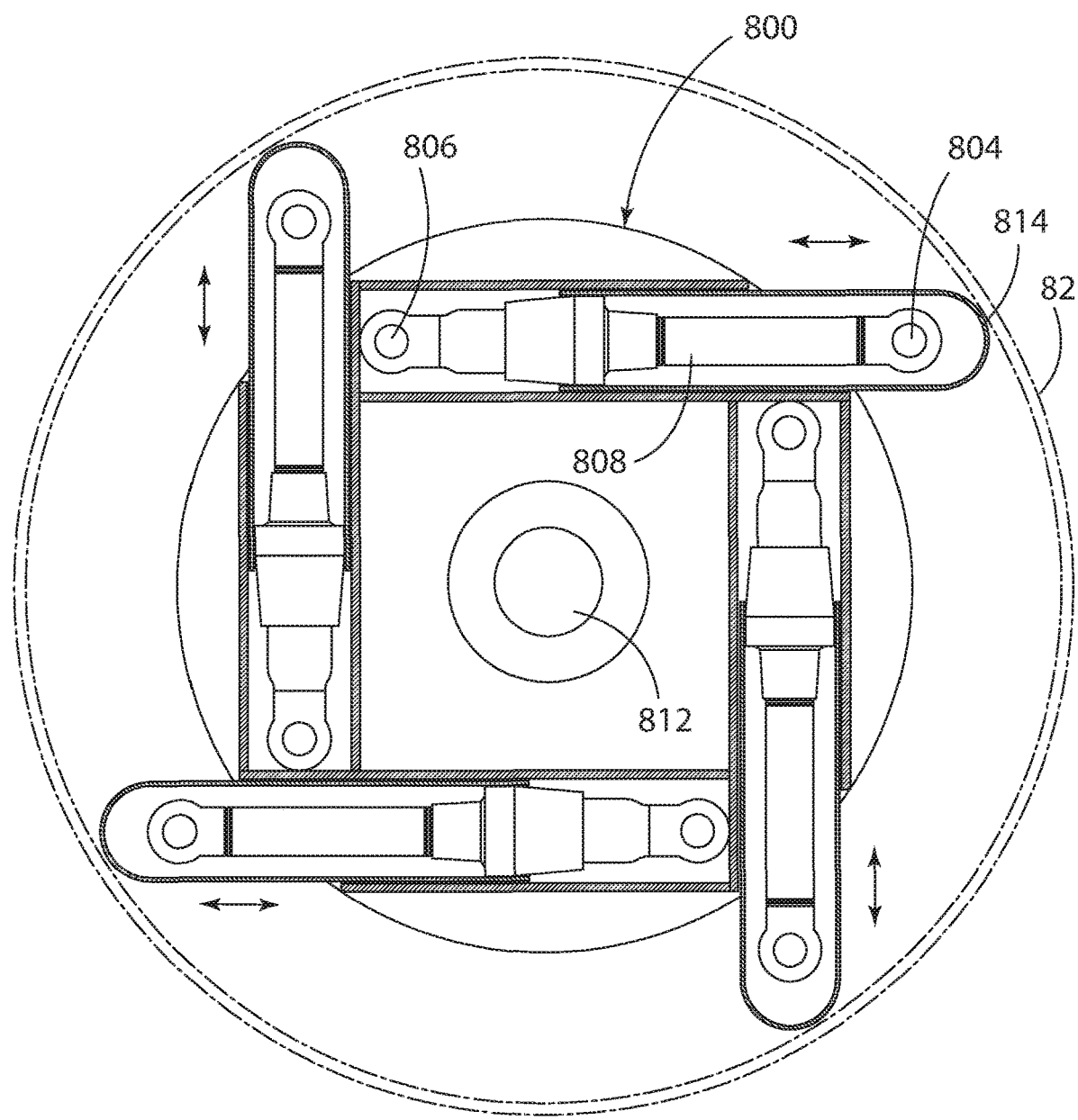
FIG. 36 illustrates a top view of an optional clamping and/or rotating assembly of FIG. 35 in an extended position.

FIG. 36 illustrates a top view of an optional clamping and/or rotating assembly of FIG. 35 in an extended position. This optional feature can be connected to the cutter assembly and used to hold the cutter assembly in place during a cut. This optional assembly can also be used to rotate the cutting assembly within the pipe when multiple cuts are desired. As shown in this embodiment, optional internal clamp 800 can to hold and/or rotate the cutter within pipe 802 using a hydraulic piston 808 mounted to clamp piston 808 end 804 to base plate 810 using mount 806. Clamp end 814 can be extended by the piston to engage the interior wall of pipe 802.

While several embodiments of the present invention have been shown and described in detail, it to be understood that various changes and modifications could be made without departing from the scope of the invention.

The drawings and the foregoing descriptions are not intended to represent the only forms of assemblies in regard to the details of construction. Changes in form and in proportion of parts, as well as the substitution of equivalents, are contemplated as circumstances may suggest or render expedient.

While the embodiments have been described in conjunction with specific embodiments, it is evident that many alternatives, modifications and variations will be apparent to those skilled in the art in light of the foregoing description. Accordingly, the present embodiments attempt to embrace all such alternatives, modifications and variations that fall within the spirit and scope of the appended claims. Throughout this specification and the drawings and figures associated with this specification, numerical labels of previously shown or discussed features may be reused in another drawing figure to indicate similar features.

LIST OF REFERENCE NUMBERS 40 cutting head 40
42 crane 42
44 tube/pipe/pile 44
46 housing o-ring and channel to withstand up to about 10,000 PSI
48 cutter step to allow overlap in retracted position
50 top plate
52 main casing
54 openings for bolts 56 to clamp top plate 55 to casing 52
55 threaded holes to received bolts 56
56 bolts or other connectors to clamp top plate onto the casing
58 casing cavity to receive hydraulic fluid
60 blade
61 rounded edge in lieu of blade for crimping applications and to deform metal
62 piston head
63 piston/cutter assembly
64 piston cutter plate
66 cuter mounting bracket
68 bolts to mount cutter onto cylinder
70 cylinder wall
72 hydraulic fluid
74 cylinder seals
76 rear plate for cylinder acts as a stop
78 piston cutter bracket
80 fixed seal within cylinder wall 70
82 second hydraulic conduit through top plate and casing for hydraulic fluid to push back pistons to retracted position
84 opening for conduit 82 to mount second hydraulic line
85 O-ring
86 stop for retracted cutter
88 opening in top plate 50 to mount hydraulic hose 90
90 hydraulic hose
92 cylinder wall mate to top plate 50
100 alternate cutter with arched blade
102 bracket for blade 100

200 alternate configuration with piston having a shaft guided within the casing cavity
202 guide blocks for internal piston shaft 204
204 piston shaft
300 alternate approach with multiple hydraulic cylinders
302 cutter
304 hydraulic cylinder
306 plate to mount hydraulic cylinders
308 mount of plate to hydraulic cylinders
310 pressure sensor
400 alternate approach with multiple hydraulic cylinders
402 cutter
404 hydraulic cylinder
406 stop
408 housing plates
410 pipe
500 alternate approach with one rotatable hydraulic cylinders
502 pipe
504 cutter
506 hydraulic cylinder
508 stop
510 mounting platform
512 rotatable mount
600 alternate approach with multiple hydraulic cylinders per blade
610 cutter blade
612 hydraulic cylinders
614 track for cutter
616 frame to hold cylinders and cutter
700 alternate approach with multiple hydraulic cylinders per opposing blade pair
710 cutter blade
712 hydraulic cylinders
714 track for cutter
716 frame to hold cylinders and cutter
718 pipe
800 optional internal clamp to hold and/or rotate internal cutter
802 pipe
804 hydraulic mount to clamp end
806 hydraulic mount to base plate 810
810 base plate
812 center opening to receive retrieving line
814 clamp end

I claim:

1. An assembly to internally cut a hollow piling, comprising:
a pressurized hydraulic fluid supply configured to supply enough force to cut through up to a circumference of a piling;
a housing having a cavity to receive the hydraulic fluid, the housing having at least two cylinder walls in fluid communication with the cavity;
a slidably disposed piston assembly within each of the at least two cylinder walls configured to extend from each of the at least two cylinder walls in response to the introduction of pressurized hydraulic fluid into the housing cavity; and
a blade fixedly and interchangeably attached at a radially distal end of each of the at least two piston assemblies, wherein the blade is configured to apply a cutting force to an entire circumference of a hollow piling solely from a single extension of the slidably disposed at least two piston assemblies;
wherein the assembly is configured so that as the piston assembly extends through each of the at least two cylinder walls, a cutting force by the attached blades is applied to through-cut the entire circumference of an encountered internal piling wall in the single extension of the piston assembly while the housing is held in a stationary non-rotating position;
wherein the blade cutting edges combine to form a single planar cutting surface to cut through up to the entire circumference of the entire piling; and
wherein the at least two piston assemblies each has a first stop to limit extending beyond a predetermined extension stroke and a second stop on the housing to limit retracting of each of the at least two piston assemblies beyond a predetermined stroke.

2. The assembly of claim 1, wherein the pressurized hydraulic fluid supply is in a range up to 20,000 PSI.

3. The assembly of claim 1, further comprising:
at least one sealing ring on each of the piston assemblies;
a fixed piston sealing ring on each of the at least two cylinder walls radially distal from each of the at least two piston sealing rings; and
a second hydraulic supply between each of the at least two cylinder walls sealing ring and the at least two piston sealing rings, wherein the second hydraulic supply supplies enough force to retract the at least two piston assemblies from an extended position to a retracted position toward an unpressurized housing cavity.

4. The assembly of claim 3, wherein the second hydraulic fluid supply is pressurized up to 5,000 PSI.

5. The assembly of claim 1, wherein the housing is 32 inches, wherein it is sized to cut a 36 inch diameter pipe with a 1 inch thickness (OD 36", ID 34").

6. The assembly of claim 1, wherein at least two piston assemblies each have a stroke of up to 4.5 inches.

7. The assembly of claim 1, wherein the blade cutting edges are stepped on the upper and lower surface to allow overlapping of the blades when the blades are retracted.

8. The assembly of claim 1, wherein the pressurized hydraulic fluid supply is in a range of about 8,000 to 12,000 PSI.

9. The assembly of claim 1, wherein the pressurized hydraulic fluid supply is about 10,000 PSI.

10. The assembly of claim 1, wherein the at least two piston/blade assemblies comprise five piston/blade assemblies radially arrayed in a planar orientation,
wherein the blade cutting edges are stepped on alternating upper and lower surfaces to allow overlapping of the blades when the blades are retracted.

11. An assembly to crimp a hollow piling, comprising:
a pressurized hydraulic fluid supply configured to supply enough force to crimp a circumference of a piling;
a housing having a cavity to receive the hydraulic fluid, the housing having at least two cylinder walls in fluid communication with the cavity;
a slidably disposed piston assembly within each of the at least two cylinder walls configured to extend from each of the at least two cylinder walls in response to the introduction of pressurized hydraulic fluid into the housing cavity;
attached at a radially distal end of the at least two piston assemblies one of a fixedly attached interchangeable crimping or fixedly attached interchangeable cutting blade; and
wherein the fixedly attached interchangeable crimping blade has a rounded edge to provide a single crimp along a single plane circumference of the piling when a crimping force is applied to an encountered piling wall;

wherein the crimping blade is configured to apply a crimping force to an entire circumference of a hollow piling solely from a single extension of the slidably disposed at least two piston assemblies;

wherein the assembly is configured so that as the piston assembly extends through each of the at least two cylinder walls, a crimping force by the attached crimping blades is applied to crimp the entire circumference of an encountered internal piling wall in the single extension of the piston assembly while the housing is held in a stationary non-rotating position;

wherein the crimping blade cutting edges combine to form a single planar crimping surface to crimp the entire circumference of the entire piling; and wherein the at least two piston assemblies each has a first stop to limit extending beyond a predetermined extension stroke and a second stop on the housing to limit retracting of each of the at least two piston assemblies beyond a predetermined retraction stroke.

\* \* \* \* \*